United States Patent
Basta et al.

(10) Patent No.: US 12,325,504 B2
(45) Date of Patent: Jun. 10, 2025

(54) MAGNETIC BALLAST DISPENSER

(71) Applicant: World View Enterprises Inc., Tucson, AZ (US)

(72) Inventors: Timothy James Basta, Tucson, AZ (US); Daniel Lee Robinson, Tucson, AZ (US)

(73) Assignee: World View Enterprises Inc., Tucson, AZ (US)

(*) Notice: Subject to any disclaimer, the term of this patent is extended or adjusted under 35 U.S.C. 154(b) by 0 days.

(21) Appl. No.: 17/982,402

(22) Filed: Nov. 7, 2022

(65) Prior Publication Data

US 2024/0150001 A1     May 9, 2024

(51) Int. Cl.
*B64B 1/70* (2006.01)
*H01F 7/20* (2006.01)

(52) U.S. Cl.
CPC .............. *B64B 1/70* (2013.01); *H01F 7/206* (2013.01); *H01F 2007/208* (2013.01)

(58) Field of Classification Search
CPC ...... B64B 1/70; H01F 7/206; H01F 2007/208
See application file for complete search history.

(56) References Cited

U.S. PATENT DOCUMENTS

| | | | |
|---|---|---|---|
| 1,012,559 A | 12/1911 | Kalaba | |
| 1,056,503 A | 3/1913 | Cooper | |
| 1,314,446 A | 8/1919 | Webb, Sr. | |
| 1,418,491 A * | 6/1922 | Stahl | B64B 1/40 244/94 |
| 1,477,338 A | 12/1923 | Finley | |
| 1,656,780 A | 1/1928 | Diago | |
| 2,740,598 A | 4/1956 | Van Krevelen | |
| 2,756,948 A | 7/1956 | Winzen et al. | |
| 2,771,256 A | 11/1956 | Ryan | |
| 2,865,581 A | 12/1958 | Froehlich | |
| 2,900,149 A * | 8/1959 | Winzen | B64B 1/58 244/94 |
| 2,907,502 A * | 10/1959 | Lang | B64B 1/58 251/300 |

(Continued)

FOREIGN PATENT DOCUMENTS

| | | |
|---|---|---|
| CN | 102004504 | 1/2013 |
| CN | 102673770 | 3/2015 |

(Continued)

OTHER PUBLICATIONS

Goudsmit Magnets, GM17852 Electropermanent magnet, Nov. 19, 2018 (Year: 2018).*

(Continued)

*Primary Examiner* — Brady W Frazier
*Assistant Examiner* — Peter A Taraschi
(74) *Attorney, Agent, or Firm* — Knobbe, Martens, Olson & Bear, LLP

(57) ABSTRACT

A ballast dispenser system and method for flight vehicles, such as high altitude lighter than air vehicles. The system passively retains ballast without power and deploys ballast in response to applying power. An electro-permanent magnet passively retains ballast within the dispenser. Application of power to a coil produces an opposing magnetic field that reduces the overall strength of a net magnetic field acting on the ballast. Lateral positional control of the electro-permanent magnet provides calibration and control of the retaining magnetic field strength. A collapsible silo may hold ballast prior to dispensing ballast and collapse upon landing for minimizing damage.

20 Claims, 13 Drawing Sheets

(56) References Cited

U.S. PATENT DOCUMENTS

| | | |
|---|---|---|
| 2,929,065 A | 3/1960 | Kreinheder |
| 2,931,597 A | 4/1960 | Moore, Jr. |
| 3,135,163 A | 6/1964 | Mechlin, Jr. et al. |
| 3,142,063 A | 7/1964 | Goetzmann, Jr. |
| 3,195,834 A | 7/1965 | Huch et al. |
| 3,260,480 A | 7/1966 | Ash et al. |
| 3,312,427 A | 4/1967 | Yost |
| 3,424,405 A | 1/1969 | Struble, Jr. |
| 3,432,122 A | 3/1969 | Flickinger et al. |
| 3,558,083 A | 1/1971 | Conley et al. |
| 3,698,281 A | 10/1972 | Brandt et al. |
| 3,778,010 A | 12/1973 | Potts et al. |
| 4,113,206 A | 9/1978 | Wheeler |
| 4,164,721 A | 8/1979 | Ishida et al. |
| 4,204,213 A | 5/1980 | Wheeler et al. |
| 4,215,834 A | 8/1980 | Dunlap |
| 4,529,153 A | 7/1985 | Conn |
| 4,571,841 A * | 2/1986 | Campbell .......... B23Q 17/2225 33/628 |
| 4,586,456 A | 5/1986 | Forward |
| 5,111,213 A | 5/1992 | Jahoda et al. |
| 5,149,015 A | 9/1992 | Davis |
| 5,251,850 A | 10/1993 | Noren |
| 5,333,817 A | 8/1994 | Kalisz et al. |
| 6,116,538 A | 9/2000 | Häfelfinger |
| 6,250,227 B1 | 6/2001 | Salort |
| 6,527,223 B1 | 3/2003 | Mondale |
| 6,609,680 B2 | 8/2003 | Perry et al. |
| 6,648,272 B1 | 11/2003 | Kothman |
| 6,791,510 B2 | 9/2004 | Watanabe et al. |
| 6,805,319 B2 | 10/2004 | Senepart |
| 6,983,910 B2 | 1/2006 | Yajima et al. |
| 7,055,777 B2 | 6/2006 | Colting |
| 7,156,342 B2 | 1/2007 | Heaven, Jr. et al. |
| 7,469,857 B2 | 12/2008 | Voss |
| 8,061,648 B2 | 11/2011 | Lachenmeier |
| 8,091,826 B2 | 1/2012 | Voorhees |
| 8,104,718 B2 | 1/2012 | Shaw |
| 8,116,763 B1 | 2/2012 | Olsen |
| 8,158,236 B2 | 4/2012 | Liggett et al. |
| 8,167,240 B2 | 5/2012 | Greiner |
| 8,267,348 B2 | 9/2012 | Alavi |
| 8,286,910 B2 | 10/2012 | Alavi |
| 8,505,847 B2 | 8/2013 | Ciampa et al. |
| 8,590,830 B2 | 11/2013 | Izutsu et al. |
| 8,622,338 B2 | 1/2014 | Ciampa et al. |
| 8,668,161 B2 | 3/2014 | Heppe |
| 8,718,477 B2 | 5/2014 | DeVaul et al. |
| 8,777,156 B2 | 7/2014 | Piini et al. |
| 8,781,727 B1 | 7/2014 | Bonawitz et al. |
| 8,804,228 B1 | 8/2014 | Biffle et al. |
| 8,812,176 B1 | 8/2014 | Biffle et al. |
| 8,814,084 B2 | 8/2014 | Shenhar |
| 8,820,678 B2 | 9/2014 | DeVaul et al. |
| 8,833,696 B1 | 9/2014 | Teller et al. |
| 8,849,571 B1 | 9/2014 | Bonawitz et al. |
| 8,862,403 B1 | 10/2014 | Piponi et al. |
| 8,874,356 B1 | 10/2014 | Bonawitz |
| 8,880,326 B1 | 11/2014 | Bonawitz et al. |
| 8,897,933 B1 | 11/2014 | Teller et al. |
| 8,910,905 B2 | 12/2014 | DeVaul et al. |
| 8,917,995 B1 | 12/2014 | Biffle et al. |
| 8,918,047 B1 | 12/2014 | Teller et al. |
| 8,948,927 B1 | 2/2015 | Piponi |
| 8,971,274 B1 | 3/2015 | Teller et al. |
| 8,988,253 B2 | 3/2015 | Teller et al. |
| 8,996,024 B1 | 3/2015 | Teller et al. |
| 8,998,128 B2 | 4/2015 | Ratner |
| 9,010,691 B1 | 4/2015 | Ratner et al. |
| 9,016,634 B1 | 4/2015 | Ratner et al. |
| 9,027,874 B1 | 5/2015 | Roach et al. |
| 9,033,274 B2 | 5/2015 | DeVaul et al. |
| 9,045,213 B1 | 6/2015 | DeVaul |
| 9,067,666 B1 | 6/2015 | Roach et al. |
| 9,085,348 B1 | 7/2015 | Roach et al. |
| 9,090,323 B1 | 7/2015 | Ratner |
| 9,093,754 B2 | 7/2015 | Behroozi et al. |
| 9,096,301 B1 | 8/2015 | Biffle et al. |
| 9,096,302 B2 | 8/2015 | Zhang et al. |
| 9,097,361 B1 | 8/2015 | Ratner |
| 9,106,336 B1 | 8/2015 | Brouillet |
| 9,114,866 B1 | 8/2015 | Roach |
| 9,120,551 B1 | 9/2015 | Ratner |
| 9,139,278 B1 | 9/2015 | Roach et al. |
| 9,139,279 B2 | 9/2015 | Heppe |
| 9,148,215 B1 | 9/2015 | Bonawitz |
| 9,153,854 B1 | 10/2015 | Biffle et al. |
| 9,174,718 B1 | 11/2015 | Roach et al. |
| 9,174,720 B1 | 11/2015 | Ratner |
| 9,174,738 B1 | 11/2015 | Roach et al. |
| 9,193,480 B2 | 11/2015 | Smith et al. |
| 9,195,938 B1 | 11/2015 | Bonawitz et al. |
| 9,201,426 B1 | 12/2015 | Bonawitz |
| 9,203,148 B1 | 12/2015 | Teller et al. |
| 9,211,942 B1 | 12/2015 | Roach |
| 9,221,531 B1 | 12/2015 | Brookes |
| 9,233,746 B2 | 1/2016 | DeVaul et al. |
| 9,242,712 B1 | 1/2016 | Ratner |
| 9,254,906 B1 | 2/2016 | Behroozi et al. |
| 9,266,598 B1 | 2/2016 | DeVaul |
| 9,275,551 B2 | 3/2016 | Bonawitz et al. |
| 9,281,554 B1 | 3/2016 | Behroozi et al. |
| 9,281,896 B2 | 3/2016 | Teller et al. |
| 9,285,450 B2 | 3/2016 | DeVaul et al. |
| 9,290,258 B1 | 3/2016 | DeVaul |
| 9,296,461 B1 | 3/2016 | Roach |
| 9,296,462 B1 | 3/2016 | Brookes et al. |
| 9,300,388 B1 | 3/2016 | Behroozi et al. |
| 9,306,271 B1 | 4/2016 | Biffle et al. |
| 9,306,668 B2 | 4/2016 | DeVaul et al. |
| 9,318,789 B1 | 4/2016 | Henrich et al. |
| 9,321,517 B1 | 4/2016 | DeVaul |
| 9,325,058 B2 | 4/2016 | Le |
| 9,327,816 B1 | 5/2016 | Mathe et al. |
| 9,327,817 B1 | 5/2016 | Roach |
| 9,327,818 B1 | 5/2016 | Roach |
| 9,327,844 B2 | 5/2016 | Ratner |
| 9,329,600 B2 | 5/2016 | DeVaul et al. |
| 9,340,272 B2 | 5/2016 | DeVaul et al. |
| 9,346,531 B1 | 5/2016 | Washburn et al. |
| 9,346,532 B1 | 5/2016 | Ratner |
| 9,384,920 B1 * | 7/2016 | Bakulich .................. H01H 9/24 |
| 9,424,752 B1 | 8/2016 | Bonawitz |
| 9,457,886 B2 | 10/2016 | Hazen |
| 9,463,861 B2 | 10/2016 | Smith et al. |
| 9,463,863 B1 | 10/2016 | Roach et al. |
| 9,520,940 B2 | 12/2016 | Teller |
| 9,532,174 B2 | 12/2016 | Teller |
| 9,540,091 B1 | 1/2017 | MacCallum et al. |
| 9,584,214 B2 | 2/2017 | Teller et al. |
| 9,658,618 B1 | 5/2017 | Knoblach et al. |
| 9,694,910 B2 | 7/2017 | MacCallum et al. |
| 9,826,407 B2 | 11/2017 | Teller et al. |
| 9,829,561 B2 | 11/2017 | Bonawitz et al. |
| 9,834,297 B2 | 12/2017 | Brookes |
| 9,845,140 B2 | 12/2017 | Crites |
| 9,868,537 B2 | 1/2018 | Leidich et al. |
| 9,908,609 B1 | 3/2018 | Fourie |
| 9,925,718 B2 | 3/2018 | Roach et al. |
| 10,124,875 B1 | 11/2018 | Farley et al. |
| 10,162,044 B2 | 12/2018 | DeVaul et al. |
| 10,196,123 B2 | 2/2019 | De Jong |
| 10,196,845 B2 | 2/2019 | Mazzocco et al. |
| 10,316,554 B2 | 6/2019 | Ben Abdelaziz |
| 10,336,432 B1 | 7/2019 | Farley et al. |
| 10,737,754 B1 | 8/2020 | Farley et al. |
| 10,787,268 B2 | 9/2020 | Leidich et al. |
| 10,829,192 B1 | 11/2020 | Farley et al. |
| 10,829,229 B2 | 11/2020 | MacCallum et al. |
| 10,875,618 B2 | 12/2020 | Ponda et al. |
| 10,988,227 B2 | 4/2021 | MacCallum et al. |
| 11,040,422 B1 * | 6/2021 | Davis .................. B23Q 1/0054 |
| 11,447,262 B2 | 9/2022 | Farley et al. |
| 2003/0040273 A1 | 2/2003 | Seligsohn et al. |

(56) References Cited

U.S. PATENT DOCUMENTS

| | | |
|---|---|---|
| 2003/0127560 A1 | 7/2003 | Liss |
| 2004/0059476 A1 | 3/2004 | Nichols |
| 2009/0205166 A1* | 8/2009 | Murray ............... A47H 23/01 |
| | | 16/221 |
| 2013/0043341 A1 | 2/2013 | Tai et al. |
| 2013/0177322 A1 | 7/2013 | DeVaul et al. |
| 2014/0014770 A1 | 1/2014 | Teller et al. |
| 2015/0336653 A1 | 11/2015 | Anderson et al. |
| 2016/0018823 A1 | 1/2016 | Longmier et al. |
| 2016/0052614 A1 | 2/2016 | Longmier et al. |
| 2016/0083068 A1 | 3/2016 | Crites |
| 2016/0096612 A1 | 4/2016 | Longmier et al. |
| 2016/0207605 A1 | 7/2016 | Jensen et al. |
| 2016/0368202 A1 | 12/2016 | Crites |
| 2017/0267326 A1* | 9/2017 | Kuhlmann ............... B64B 1/70 |
| 2017/0331177 A1 | 11/2017 | MacCallum et al. |
| 2018/0093750 A1 | 4/2018 | Svoboda, Jr. |
| 2019/0233088 A1 | 8/2019 | Hayes et al. |
| 2019/0329869 A1* | 10/2019 | Haas ................ B64C 17/08 |
| 2021/0114707 A1 | 4/2021 | Farley et al. |
| 2021/0122479 A1 | 4/2021 | MacCallum et al. |
| 2021/0123741 A1 | 4/2021 | Candido et al. |
| 2021/0124352 A1 | 4/2021 | Candido et al. |
| 2021/0181768 A1 | 6/2021 | Candido et al. |
| 2021/0210267 A1 | 7/2021 | Jochum |
| 2021/0210296 A1 | 7/2021 | Morton et al. |
| 2021/0221118 A1 | 7/2021 | Falcon et al. |
| 2021/0309338 A1 | 10/2021 | MacCallum et al. |
| 2022/0214127 A1* | 7/2022 | French ................ F41A 19/16 |

FOREIGN PATENT DOCUMENTS

| | | |
|---|---|---|
| CN | 204937453 | 1/2016 |
| CN | 112918657 | 6/2021 |
| CN | 216035059 | 3/2022 |
| DE | 10 2008 008 416 | 9/2009 |
| DE | 10 2008 035 028 | 1/2010 |
| EP | 0 401 891 | 12/1992 |
| EP | 3 414 157 A1 | 12/2018 |
| EP | 3 414 157 B1 | 11/2020 |
| FR | 2 320 229 | 3/1977 |
| FR | 2 834 966 | 7/2003 |
| JP | 2002-096798 | 4/2002 |
| JP | 2005-166429 | 6/2005 |
| KR | 20140056638 A * | 5/2014 |
| RU | 2 028 962 | 2/1995 |
| RU | 2 186 003 | 7/2002 |
| WO | WO 1997/015992 | 5/1997 |
| WO | WO 2006/119056 | 11/2006 |
| WO | WO 2007/079788 | 7/2007 |
| WO | WO 2013/041820 | 3/2013 |
| WO | WO 2014/025622 | 2/2014 |
| WO | WO 2014/193711 | 12/2014 |
| WO | WO 2015/031165 | 3/2015 |
| WO | WO 2015/076899 | 5/2015 |
| WO | WO 2015/094534 | 6/2015 |
| WO | WO 2015/094941 | 6/2015 |
| WO | WO 2015/102813 | 7/2015 |
| WO | WO 2015/122988 | 8/2015 |
| WO | WO 2015/130414 | 9/2015 |
| WO | WO 2015/157237 | 10/2015 |
| WO | WO 2015/196216 | 12/2015 |
| WO | WO 2016/081345 | 5/2016 |
| WO | WO 2016/209762 | 12/2016 |
| WO | WO 2017/127746 | 7/2017 |
| WO | WO 2017/139283 | 8/2017 |
| WO | WO 2022/062488 | 3/2022 |

OTHER PUBLICATIONS

Stratocat, Stratopedia "A, Atmosphere", Apr. 25, 2022 (Year: 2022).*
"Ballast", StratoCat, date accessed Jul. 14, 2022 (publication date unknown), in 3 pages. URL: http://stratocat.com.ar/stratopedia/64.htm.
Bil, C.: "Lighter-Than-Air Stationary Observation Platforms", 15th Australian International Aerospace Congress (AIAC15), Feb. 2013, pp. 97-103.
Browne, M.: "Balloon Teams Vie to be First Around World", The New York Times, published Jun. 7, 1994, in 6 pages.
Cherry, N. J. et al.: "Characteristics and Performance of Three Low-Cost Superpressure Balloon (Tetroon) Systems", Journal of Applied Meteorology, vol. 10, 1971, pp. 982-990.
Chupik, B. et al., "Balloon Altitude Command Control Housing for Unmanned Sensing (BACCHUS)", University of Colorado, Department of Aerospace Engineering Sciences ASEN 4018, Conceptual Design Document (CDD), accessed Jul. 14, 2022 (publication date unknown) in 45 pages. URL: https://www.colorado.edu/aerospace/sites/default/files/attached-files/bacchus-cdd.pdf.
De Jong, M., Venus Altitude Cycling Balloon, Venus Lab and Technology Workshop, paper 4030, Apr. 7, 2015, in 1 page.
Epley, L.E: "A System Architecture for Long Duration Free Floating Flight for Military Applications", CIRRUS Aerospace Corporation, Aug. 31, 1990, in 65 pages.
Etherington, D.: "World View's 'stratollites' and new spaceport aim to change the business of space", TechCrunch, posted Feb. 23, 2017, in 9 pages. URL: https://techcrunch.com/2017/02/23/world-views-stratollites-and-new-spaceport-aim-to-change-the-business-of-space/.
Goebel, G., "[3.0] Cold War Balloon Flights 1945:1965", AirVectors.net, Aug. 1, 2021, in 11 pages. URL: http://www.airvectors.net/avbloon_3.html.
Jones, J.: "Long-Life Stratospheric Balloon System with Altitude Control", NASA Tech Briefs, online article posted Jan. 1, 2002. http://www.techbriefs.com/component/content/article/ntb/tech-briefs/physical-sciences/2248.
Lachenmeier, T.T.: "Design of a Trans-Global Manned Balloon System with Relevance to Scientific Ballooning", American Institute of Aeronautics and Astronautics, Inc., DOI: 10.2514/6.1991-3687, Oct. 1991.
Lawler, R.: "Google exec sets a new record for highest-altitude jump (video)", Engadget, online article published Oct. 24, 2014. https://www.engadget.com/2014/10/24/google-exec-alan-eustace-stratex-high-altitude-jump/.
Longhetto, A.: "Some Improvements in the Balanced Pilot Balloons Technique", Atmospheric Environment Pergamon Press, vol. 5, 1971, pp. 327-331.
Markoff, J.: "Parachutist's Record Fall: Over 25 Miles in 15 Minutes", The New York Times, online article published Oct. 24, 2014. http://www.nytimes.com/2014/10/25/science/alan-eustace-jumps-from-stratosphere-breaking-felix-baumgartners-world-record.html?_r=1.
New Atlas: "Google exec sets new high-altitude skydiving world record", New Atlas, online article published Oct. 26, 2014. http://newatlas.com/alan-eustace-world-record-skydive-stratex/34423/pictures.
Nobuyuki, Yajima, et al: "Dual Balloon Systems", Scientific Ballooning: Technology and Applications of Exploration Balloons Floating in the Stratosphere and the Atmospheres of Other Planets. Springer Science & Business Media, Apr. 2009, pp. 48-52 (via Google Books). https://books.google.com.sg/books?id=_iEHI7Nh6yYC&lpg=PA51&dq=(super%20pressure%20and%20zero%20pressure%20balloon)%20(tandem%20OR%20buoyant)&pg=PR1#v=onepage&q=(super%20pressure%20and%20zero%20pressure%20balloon)%20(tandem%20OR%20buoyant)&f=false.
Noor, A. et al.: "Stratospheric Aircraft", Future Aeronautical and Space Systems. American Institute of Aeronautics and Astronautics, Inc., vol. 172, 1997, p. 241 (via Google Books). https://books.google.com.sg/books?id=uuR5yBwvhsQC&lpg=PA241&dq=(super%20pressure%20and%20zero%20pressure%20balloon)%20(tandem%20OR%20buoyant)&pg=PA241#v=onepage&q=(super%20pressure%20and%20zero%20pressure%20balloon)%20(tandem%20OR%20buoyant)&f=false.
NuancedAdmin: "Paragon Completes Record-Breaking Near-Space Dive Via High-Altitude Balloon", Paragon Space Development Corporation, press release dated Oct. 20, 2015.
PR Newswire: "World View and Ball Aerospace Demonstrate Persistent Remote Sensing from Stratollite Platform", Yahoo Finance,

(56) References Cited

OTHER PUBLICATIONS posted Feb. 23, 2017, in 8 pages. URL: http://finance.yahoo.com/news/world-view-ball-aerospace-demonstrate-220000300.html.
Red Bull Stratos: "High Altitude Balloon", Red Bull Stratos, [date posted unknown], accessed online on Jul. 1, 2016. http://www.redbullstratos.com/technology/high-altitude-balloon/.
Saito, Y. et al.: "Properties of tandem balloons connected by extendable suspension wires", Advances in Space Research, vol. 45, 2010, pp. 482-489.
Saito, Y. et al: "Development of a tandem balloon system with a super-pressure balloon and a zero-pressure balloon I", JAXA Research and Development Report, Japan Aerospace Exploration Agency, JAXA-RR-11-008, Mar. 2012, in 16 pages.
Saito, Y. et al: "Development of a tandem balloon system with a super-pressure balloon and a zero-pressure balloon II", JAXA Research and Development Report, Japan Aerospace Exploration Agency, JAXA-RR-13-011, Mar. 2014, in 36 pages.
Smith, M.S et al.: "Optimum Designs for Superpressure Balloons", Advances in Space Research, vol. 33, Iss. 10, Dec. 2004, in 9 pages.
STRATOCAT: "News Archive—Jun. 2012", StratoCat, page generated Aug. 2, 2015. http://stratocat.com.ar/news0612e.htm.
Wikipedia: "Sky anchor", Wikipedia, accessed May 21, 2016, in 1 page. https://en.wikipedia.org/wiki/Sky_anchor.
World View: "Landmark Space Dive Sets Stage for World View Space Flights", World View, press release dated Oct. 24, 2014.
World View: "The Stratollite", YouTube, published Feb. 23, 2017, video can be accessed at https://www.youtube.com/watch?v=GFdXBQPuznU (last accessed May 20, 2019).

\* cited by examiner

MAGNETIC BALLAST DISPENSER

BACKGROUND

Field

The technology relates generally to altitude control of flight vehicles, in particular to ballast retaining and dispensing systems and methods using magnets.

Description of the Related Art

High altitude flight, generally above about 50,000 feet, with lighter-than-air (LTA) systems is of interest for many applications, including communications, scientific research, meteorology, reconnaissance, tourism, and others. These and other applications impose strict requirements on the LTA system. Some such requirements relate to control over the ascent and descent of LTA systems.

High altitude flight systems may use ballast media that may be dropped during flight to decrease the downward force. The ballast media is typically dropped using complex motorized mechanisms. Such motorized mechanisms utilize high amounts of power to heat and operate. Improvements to these and other drawbacks of existing ballast dispensers are desirable.

SUMMARY

A ballast dispenser system and method for flight vehicles, such as high altitude lighter than air vehicles, is described. The system passively retains ballast without power and deploys ballast in response to applying power. An electro-permanent magnet passively retains ballast within the dispenser. Application of power to a coil produces an opposing magnetic field that reduces the overall strength of a net magnetic field acting on the ballast. Lateral positional control of the electro-permanent magnet provides calibration and control of the retaining magnetic field strength. A collapsible silo may hold ballast prior to dispensing ballast and collapse upon landing for minimizing damage.

In some embodiments, a ballast dispenser for a lighter-than-air high altitude balloon system is provided. The ballast dispenser includes a silo containing magnetic ballast material, a dispensing tube positioned to receive the magnetic ballast material from the silo, an electro-permanent magnet positioned lateral to one side of the dispensing tube, wherein the electro-permanent magnet passively exerts a magnetic field on the magnetic ballast material in the dispensing tube to retain the ballast material within the dispensing tube, and an adjustment knob coupled to the electro-permanent magnet and operable to adjust a lateral distance between the electro-permanent magnet and the dispensing tube.

The magnetic field can be a first magnetic field, and the electro-permanent magnet can be configured to generate a second magnetic field in response to receiving power that opposes the first magnetic field so that a net external magnetic field provided by the electro-permanent magnet has a net magnetic field strength less than a first magnetic field strength of the first magnetic field. The net magnetic field strength provided by the net external magnetic field when power is received by the electro-permanent magnet can be no greater than a magnetic field strength threshold for retaining the ballast material within the dispensing tube. The electro-permanent magnet can include a passive magnet configured to generate the first magnetic field and a coil wrapped around the passive magnet, wherein the coil is configured to generate the second magnetic field when power is received by the electro-permanent magnet. The ballast dispenser can be configured to dispense the ballast material without moving components of the ballast dispenser. The ballast dispenser can include an adjustment screw coupled to the adjustment knob and configured to be received within the electro-permanent magnet, wherein rotation of the adjustment knob adjusts a depth of the adjustment screw within the electro-permanent magnet to adjust the lateral distance between the electro-permanent magnet and the dispensing tube. The ballast dispenser can include a magnet housing containing the electro-permanent magnet. The ballast dispenser can include a compression spring within the magnet housing, the compression spring exerting a force on the electro-permanent magnet to maintain a position of the electro-permanent magnet within the magnet housing. The magnet housing can be configured to couple with the adjustment knob to restrict rotation of the adjustment knob. The silo can be collapsible. The silo can include a textile material. The ballast dispenser can include one or more textile clamps coupled to the silo. The ballast dispenser can include a nozzle positioned to funnel the ballast material from the silo to the dispensing tube. The ballast dispenser can be configured to operate at temperatures of $-75°$ C. and greater. The ballast dispenser can be configured to operate at altitudes of 55,000 ft and greater. The ballast dispenser can include a removable plug configured to removably seal the dispensing tube.

In some embodiments, a method of adjusting a position of an electro-permanent magnet of a magnetic ballast dispenser is provided. The method includes retracting an adjustment knob from a magnet housing of the electro-permanent magnet, the electro-permanent magnet being positioned lateral to one side of a dispensing tube positioned to receive magnetic ballast material from a silo, and rotating the adjustment knob to adjust a lateral distance between the electro-permanent magnet and the dispensing tube so as to adjust a strength of a magnetic field exerted by the electro-permanent magnet on the magnetic ballast material in the dispensing tube.

The magnetic field can be a first magnetic field, and the method can further include supplying power to the electro-permanent magnet to generate a second magnetic field that opposes the first magnetic field so that a net external magnetic field provided by the electro-permanent magnet has a net magnetic field strength less than a first magnetic field strength of the first magnetic field. The method can include releasing the adjustment knob after rotating the adjustment knob, wherein a spring within the magnetic housing is configured to return the adjustment knob to an unretracted position after releasing the adjustment knob. The spring can be configured to exert a force on the electro-permanent magnet to maintain a position of the electro-permanent magnet within the magnet housing after releasing the adjustment knob.

DETAILED DESCRIPTION

The following detailed description is directed to certain specific embodiments of the development. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Various embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the invention described herein

A. Example LTA System with Zero Pressure Balloon and Super Pressure Balloon

Figure 1:
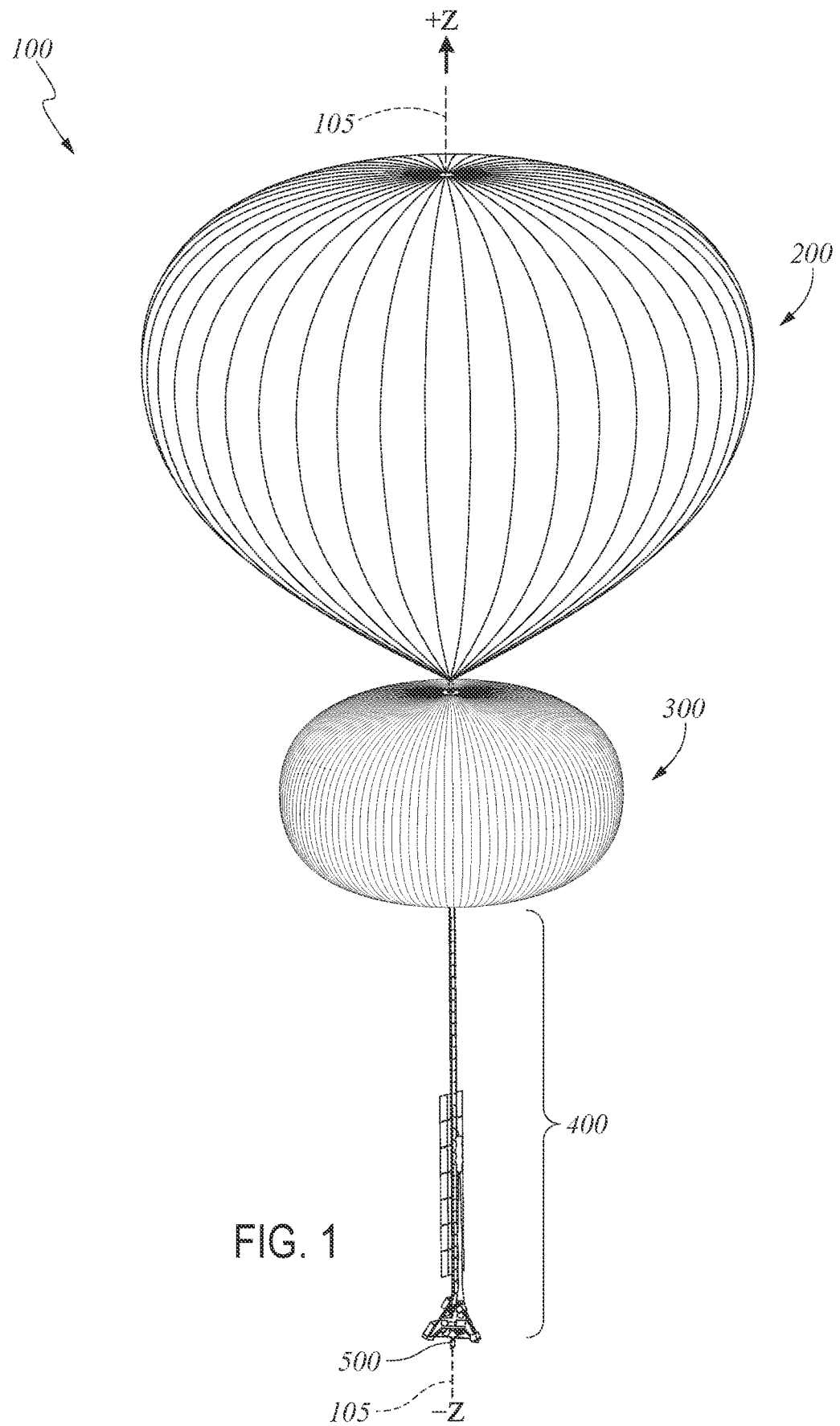
FIG. 1 is a perspective view of an embodiment of a lighter-than-air (LTA) system for high altitude flight having a magnetic ballast dispenser.

FIG. 1 is a perspective view of an embodiment of a lighter-than-air (LTA) system 100 for high altitude flight having a ballast dispenser 500, which may be a magnetic ballast dispenser. Many different types of flight vehicles may use the ballast dispenser 500 system and methods described herein. The LTA system 100 is just one example. Two other example flight vehicles that may use the ballast dispenser 500 are described in FIGS. 2 and 3, with the understanding that other flight vehicles may use the ballast dispenser system and methods described herein with respect to FIGS. 4A-5D.

As shown in FIG. 1, for reference, a longitudinal axis 105 is indicated. The longitudinal axis 105 is a reference axis for describing the system 100. Directions described as "outer," "outward," and the like, are referring to a direction at least partially away from such longitudinal axes, while directions described as "inner," "inward," and the like, are referring to a direction at least partially toward such longitudinal axes.

For reference, a +Z direction is indicated that is opposite in direction to that of gravity, and a −Z direction is indicated that is opposite in direction to the +Z direction. For the sake of description, directions described as "upper," "above," and the like, are referring to a direction at least partially in the +Z direction, and directions described as "lower," "below," and the like, are referring to a direction at least partially in the −Z direction. The +Z direction is the general direction the system 100 travels when ascending, while the −Z direction is the general direction the system 100 travels when descending. The direction of ascent and descent of the system 100 may not be aligned with, respectively, the +Z and −Z directions. For example, the system 100 may travel at an angle with respect to the +Z and −Z directions. Further, the longitudinal axis 105 may or may not align with the +/−Z directions and/or with the direction of travel of the system 100.

The LTA system 100 is shown in flight. Various features of the system 100 may change configuration, for example shape, geometry or dimensions, depending on the phase of a mission (e.g., takeoff, flight, landing). Thus, the depiction of the system 100 in any one configuration is not meant to limit the disclosure to that particular configuration. Further, the basic design of the LTA system 100 may be adapted, for example scaled, modularized, etc. for different mission requirements. The LTA system 100 may be modularized, for example with multiple super pressure balloons 300 such as in tandem pneumatically connected to each other. The description herein is primarily of a very high altitude and/or heavy payload lifting version of the LTA system 100, unless otherwise stated. Therefore, other configurations, of the basic platform for the particular LTA system 100 described herein, are within the scope of this disclosure even if not explicitly described.

In some embodiments, the LTA system 100 may be a high altitude balloon system including one or more high latitude air balloons. In some embodiments, the LTA system 100 may include a zero-pressure balloon (ZPB) 200, a super-pressure balloon (SPB) 300, a stratocraft 400, and/or a ballast dispenser 500. The ZPB 200, SPB 300, stratocraft 400 and the ballast dispenser 500 are shown coupled together in FIG. 1. In some phases of flight, the ZPB 200, SPB 300, stratocraft 400 and the ballast dispenser 500 are not coupled together. For example, portions of the stratocraft 400 and/or ballast dispenser 500 may release from the LTA system 100, such as during descent of a payload via a descent system, such as a parafoil. As a further example, the ZPB 200, SPB 300, stratocraft 400 and/or ballast dispenser 500 may separate from each other after flight termination.

The ZPB 200 is a lifting balloon. The ZPB 200 may provide lift to the LTA system 100. A lighter-than-air (LTA) gas may be provided inside the ZPB 200 in an amount at launch sufficient for the LTA system 100 to take off. The ZPB 200 may initially be under-inflated but with sufficient lifting capacity in a collapsed configuration at launch from ground, and may expand as the LTA system 100 ascends to higher altitudes with lower pressure ambient air.

The ZPB 200 is a "zero-pressure" type of balloon. A "zero-pressure balloon" contains an LTA gas therein for providing lift to the LTA system 100. The ZPB 200 may be filled with helium or hydrogen. A "zero-pressure balloon" is normally open to the atmosphere via hanging or attached ducts to prevent over-pressurization. If flying alone as a single ZPB 200, the ZPB 200 may be susceptible to the cyclic increase and decrease in altitude caused by the constant balloon envelope volume change due to heating and cooling, and therefore expansion and contraction of the lift gas inside the ZPB 200 throughout the Earth's diurnal cycle. This constant altitude change may lead to the loss of lift gas over time as the heating of the lift envelope during the day cycle causes the lift gas to expand until the maximum float altitude is reached and the LTA gas is vented out of the opening in the ZPB 200. During the night cycle, the lift gas may contract, causing the ZPB 200 envelop to contract and lose buoyancy. For this reason, the LTA system 100 may control the natural changes of buoyancy. The LTA system 100 may have the ability to bias the buoyancy even more than simply neutralizing the natural changes in order to achieve controlled altitude changes.

The ZPB 200 may support the SPB 300. As shown, the SPB 300 may be supported underneath the ZPB 200. The ZPB 200 may support the SPB 300 either directly or indirectly, for example via a rotatable actuator. In some embodiments the LTA system may not include the ZPB 200.

The SPB 300 is a variable air ballast balloon. The SPB 300 may provide a variable amount of ballast air to the LTA system 100. Ballast may be taken into the SPB 300 in the form of compressed air to provide a greater downward force to the LTA system 100. Ballast may be ejected from the SPB 300 via a valve to provide a smaller downward force to the LTA system 100. The ballast may be provided from the ambient atmospheric air, for instance by a compressor. To achieve neutral buoyancy the air ballast may be set at some fraction of the SPB 300 maximum pressure capability. This may allow biasing in both a positive (greater air ballast) and negative direction (less air ballast) which leads to a descent speed or ascent speed respectively. In some embodiments, the LTA system 100 includes only one SPB 300. However, the LTA system 100 may include multiple SPB's 300, for example, two, three, four or more.

The SPB 300 is a "super-pressure" type of balloon. A "super-pressure balloon" may be completely enclosed and may operate at a positive internal pressure in comparison to the external atmosphere. Pressure control may enable regulating the mass of air in the SPB 300, and therefore the overall buoyancy of the LTA system 100. This buoyancy regulation may enable altitude control of the LTA system 100. The SPB 300 may take in more air to apply more of a ballast force, for example to descend, or to compensate for an expanding ZPB 200 that is producing more lift. Conversely, the SPB 300 may release air to apply less of a ballast force, for example to ascend, or to compensate for a contracting ZPB 200 that is producing less lift. The SPB 300 buoyancy control may be used in combination with the downward force control provided by the ballast dispenser 500.

The SPB 300 may support the stratocraft 400 which may be a structural support. As shown, the stratocraft 400 may be coupled with the SPB 300 beneath the SPB 300. The stratocraft 400 may be directly or indirectly connected with the SPB 300. In some embodiments, there are various intermediate structures and/or systems between the SPB 300 and the stratocraft 400, such as structural connectors, release mechanisms, other structures or systems, or combinations thereof.

The stratocraft 400 may include one or more systems related to various mission objectives. The stratocraft 400 may include the payload for a particular mission. The stratocraft 400 may include various subsystems, such as power, control, communications, air intake, air release, payload descent, etc., for supporting a mission. The stratocraft 400 may include a structural connector, a ladder, solar array, payload support, payload, and/or other structures. In some embodiments, there may not be the stratocraft 400.

The stratocraft 400 may support the ballast dispenser 500. As shown, the ballast dispenser 500 may be coupled with the stratocraft 400 beneath the stratocraft 400. The ballast dispenser 500 may be directly or indirectly connected with the stratocraft 400. In some embodiments, the ballast dispenser 500 may be mechanically and/or electrically coupled to the stratocraft 400. In some embodiments, there are various intermediate structures and/or systems between the stratocraft 400 and the ballast dispenser 500, such as structural connectors, release mechanisms, other structures or systems, or combinations thereof. In some embodiments, the ballast dispenser 500 may instead be connected as described to other parts of the LTA system 100, such as the SPB 300, the ZPB 200, etc.

The stratocraft 400 may include various features for supporting mission objectives of the LTA system 100, LTA system 202, or LTA system 302, such as payload and supporting subsystems. The stratocraft 400 may have any of the features of other stratocraft embodiments such as those described in U.S. Pat. No. 9,540,091, issued Jan. 10, 2017, titled High Altitude Balloon Systems and Methods, the entire disclosure of which is incorporated herein by reference for all purposes and forms a part of this specification.

The ballast dispenser 500 may contain a ballast material which provides a downward force on the LTA system 100. The ballast dispenser 500 may release (i.e., dispense) the ballast material during flight of the LTA system 100. Releasing the ballast material may adjust the buoyancy of the LTA system 100. For example, releasing the ballast material may reduce the downward force that the ballast dispenser 500 exerts on the rest of the LTA system 100. The release of the ballast material may result in less mass being carried by the LTA system 100 and thus decrease the downward force exerted by the ballast material. The retention of the ballast material may result in maintaining the downward force exerted on the LTA system 100 by the ballast material. The LTA system 100 may control the release of the ballast material, for example, using a control system. In some embodiments, as described in further detail herein, the ballast dispenser 500 may use a dispensing method for ballast that does not require power to retain the ballast material but only for dispensing. Thus, power may not be required to retain the ballast material when the ballast is not being dispensed.

The ballast dispenser 500, the SPB 300, or both may be used to control the ascent and descent of the LTA system 100. In some embodiments, the ballast dispenser 500 and the SPB 300 may be used in combination to provide greater control of the ascent and descent of the LTA system 100. The ballast dispenser 500 and SPB 300 may be used to significantly increase the altitude of the LTA system 100 in a short amount of time.

While one ZPB 200 and one SPB 300 are shown in FIG. 1, in some embodiments, an LTA system may include multiple or no ZPBs 200 and/or multiple or no SPBs 300. In some embodiments and LTA system may include only one of the ZPB 200 and one of the SPB 300.

Figure 2:
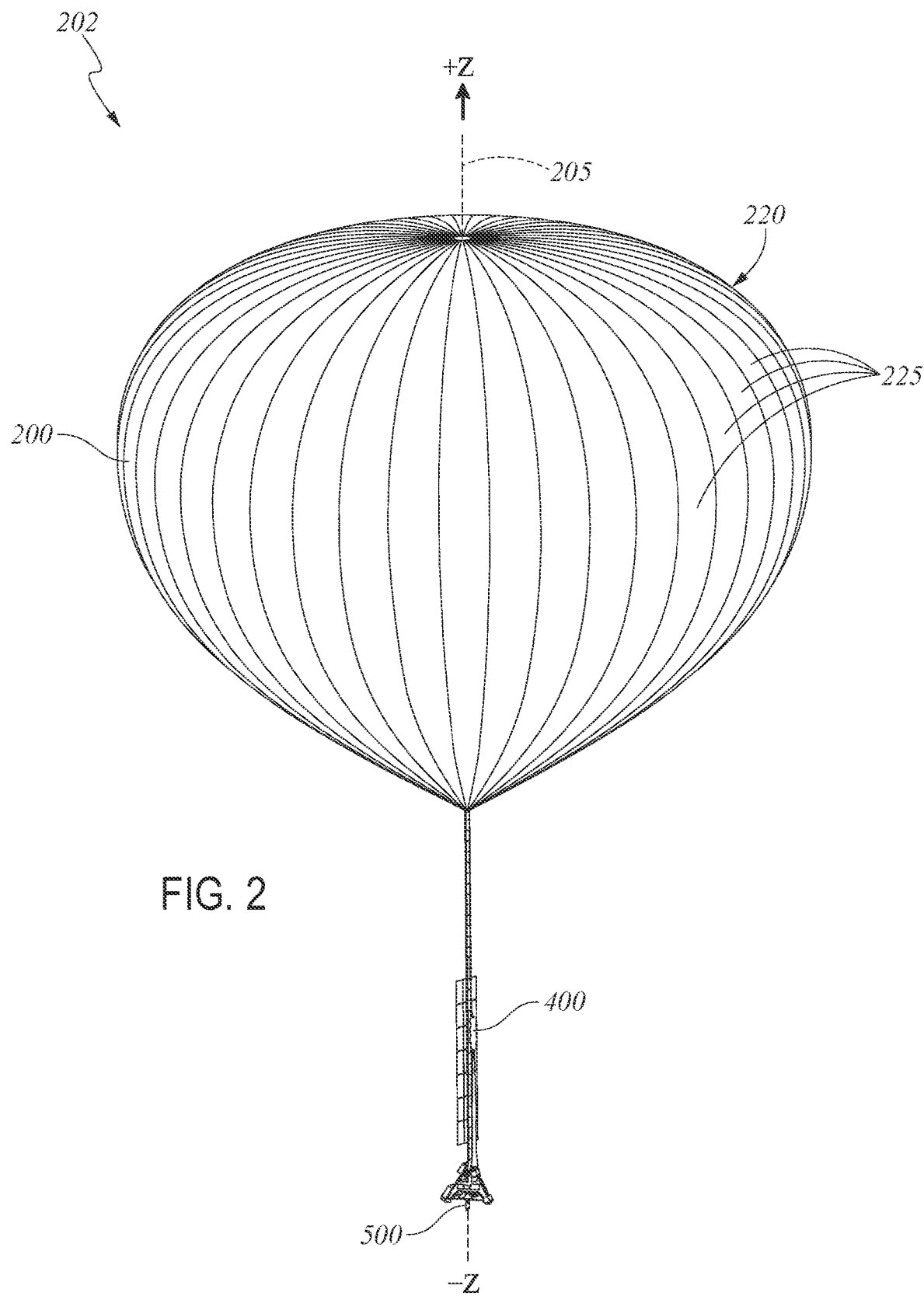
FIG. 2 is a perspective view of another embodiment of an LTA system that includes the magnetic ballast dispenser.

For example, FIG. 2 is a perspective view of another embodiment of an LTA system 202 that may include the ballast dispenser 500. The LTA system 202 may include the ZPB 200, the stratocraft 400, and the ballast dispenser 500, as further described.

Figure 3:
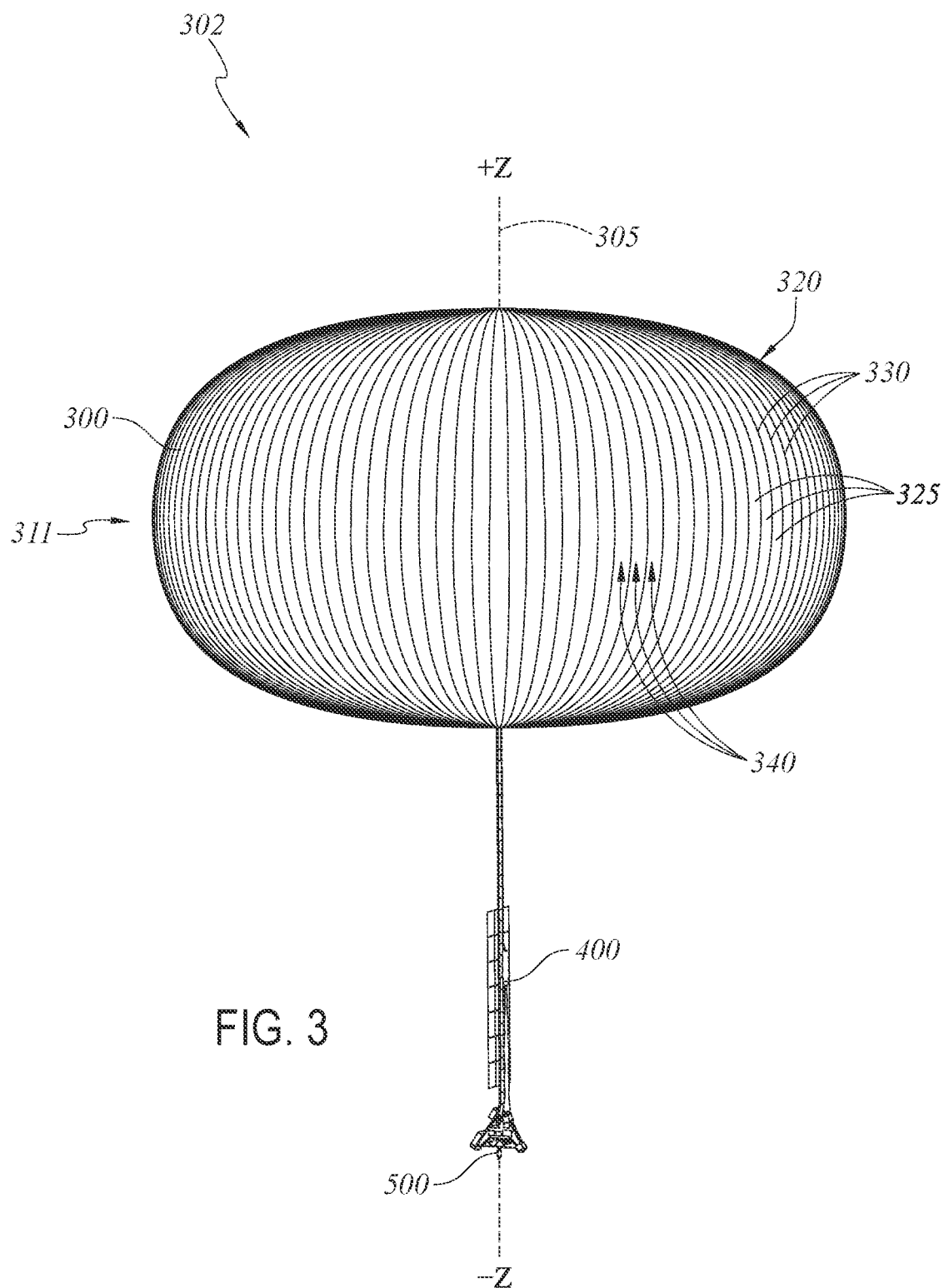
FIG. 3 is a perspective view of another embodiment of an LTA system having the magnetic ballast dispenser.

FIG. 3 is a perspective view of another embodiment of an LTA system 302 that may include the ballast dispenser 500. The LTA system 302 may include the SPB 300, the stratocraft 400, and the ballast dispenser 500, as further described.

The various flight vehicles shown and described herein are example vehicles that may use the ballast dispenser 500. Other flight vehicles and features thereof may be incorporated, such as those described in U.S. Pat. No. 9,540,091, issued Jan. 10, 2017, titled High Altitude Balloon Systems and Methods, U.S. Pat. No. 9,694,910, issued Jul. 4, 2017, titled Near-Space Operation Systems, U.S. Pat. No. 10,787,268, issued Sep. 29, 2020, titled Rigidized Assisted Opening System For High Altitude Parafoils, U.S. Pat. No. 9,868,537, issued Jan. 16, 2018, titled Riser Release Flaring System For Parafoils, U.S. Pat. No. 10,124,875, issued Nov. 13, 2018, titled Continuous Multi-Chamber Super Pressure Balloon, and U.S. Pat. No. 10,336,432, issued Jul. 2, 2019, titled Lighter Than Air Balloon Systems And Methods, the entire disclosure of each of which is incorporated herein by reference for all purposes and forms a part of this specification.

B. Example LTA System with Zero Pressure Balloon

FIG. 2 is a perspective view of the LTA system 202 having the ballast dispenser 500. The LTA system 202 may include the ZPB 200, the stratocraft 400, and the ballast dispenser 500, but not the SPB 300. Further, any features described with respect to the ZPB 200 of the LTA system 202 may be included in the ZPB 200 of the LTA system 100, and vice versa, unless otherwise indicated.

The ZPB 200 may provide a lift force in the +Z direction, as shown in FIG. 2. For reference, a geometric longitudinal axis 205 of the ZPB 200 is indicated in FIG. 2. The longitudinal axis 205 may or may not align with the +Z direction, depending on the phase of flight, environmental conditions, etc. Further, the ZPB 200 may not cause the LTA system 100 or LTA system 202 to travel exactly in the +Z direction. Thus, while the lift force is in the +Z direction, the LTA system 100 or LTA system 202 may not travel in that same direction. In some embodiments, the LTA system 100 or LTA system 202 ascends in a direction that is at an angle to the +Z direction.

The skin 220 may define one or more interior compartments of the ZPB 220 for receiving an LTA. The skin 220 may include multiple gores 225 attached together to form the envelope. In some embodiments, the ZPB 200 is configured to receive therein an LTA gas to provide an upward lifting force to the LTA system 100 or LTA system 202. The ZPB 200 may include about 500,000 cubic feet of maximum internal volume. Various versions of the ZPB 200 may include a range from about 250,000 cubic feet or less to about 30,000,000 cubic feet or more of maximum internal volume. The ZPB 200 may include sufficient lift gas to lift the gross weight of the stratocraft 400 or vehicle plus additional "free lift" which may range from 5% of the gross weight to about 25% of the gross weight depending on the application. The volume of the launch "bubble" is a fraction of the maximum design volume and usually ranges from $\frac{1}{20}$ to $\frac{1}{200}$ of design volume depending on design altitude.

The ZPB 200 may change configuration (shape, size, etc.) during flight as the lift gas volume expands and contracts. The skin 220 or portions thereof may change configuration due to launch requirements, variable air pressure, changes in volume of LTA, release of payload and descent systems, flight termination, etc.

Additional details regarding zero-pressure balloons are described in U.S. Pat. No. 9,540,091, issued Jan. 10, 2017, titled High Altitude Balloon Systems and Methods, the entire disclosure of which is incorporated herein by reference for all purposes.

C. Example LTA System with Super Pressure Balloon

FIG. 3 is a perspective view of the LTA system 302 having the ballast dispenser 500. The LTA system 302 may include the SPB 300, the stratocraft 400, and the ballast dispenser 500, but not the ZPB 200. Further, any features described with respect to the SPB 300 of the LTA system 302 may be included in the SPB 300 of the LTA system 100, and vice versa, unless otherwise indicated As shown in FIG. 3, the SPB 300 may provide a downward ballast force in the −Z direction, and/or a lift force in the +Z direction. The SPB 300 may be configured to contain lifting gas therein to provide an upward lifting force. The SPB 300 may also contain a separate compartment for ballast air. For reference, a geometric longitudinal axis 305 of the SPB 300 is indicated in FIG. 3. In some embodiments, which may include the ZPB 200, the force due to lift is greater than the combined downward force due to gravity exerted by the entire LTA system 302, including the weight of the SPB 300, the weight of the stratocraft 400, the weight of the ballast dispenser 500 etc. such that the LTA system 100 ascends in a direction that is at least partially in the +Z direction. In some embodiments, the force due to lift from lifting gas within the SPB 300 is less than the combined downward force due to gravity exerted by the entire LTA system 302, including the weight of the SPB 300, the weight of the stratocraft 400, etc. such that the LTA system 302 descends in a direction that is at least partially in the −Z direction.

The maximum dimensions of the SPB 300, for example when fully inflated, may be about 56 feet wide in diameter and about 35 feet long in height. The SPB 300 may have a range of maximum diameters from about 10 feet or less to about 500 feet or more. The SPB 300 may have a range of maximum lengths from about 5 feet or less to about 300 feet or more.

The SPB 300 may include a skin 320 forming the outer envelope. The skin 320 may define one or more interior compartments of the SPB 300 for receiving and storing ambient air. In some embodiments, the outer skin 320 defines an interior volume of the SPB 300 configured to receive therein a variable amount of ambient air from a surrounding atmosphere to provide a variable downward force to the LTA system 100. The SPB 300 may have a maximum internal volume of about 64,000 cubic feet. Various versions of the SPB 300 may include a range from about 32,000 cubic feet or less to about 90,000 cubic feet or more of maximum internal volume. The skin 320 or portions thereof may form an internal compartment configured to hold and release lifting gas.

The skin 320 may be formed from a variety of materials. In some embodiments, the skin 320 is formed from plastic, polymer, thin films, other materials, or combinations thereof. The skin 320 may be made from multiple components. As shown, the skin 320 may include gores 325.

The SPB 300 may include multiple tendons 330. The tendons 330 may be elongated flexible members. The tendons 330 may be axially-stiff, transverse-flexible rope-like members. The tendons 330 may be formed of fiber, composites, plastic, polymer, metals, other materials, or combinations thereof. The tendons 330 may be meridonially configured, extending meridonially along the SPB 300. The tendons 330 may be separate from each other. In some embodiments, some or all of the tendons 330 may be coupled together. In some embodiments, some or all of the tendons 330 may form one continuous, long tendon. In some embodiments, the LTA system 100 or the LTA system 302 may include a plurality of the tendons 330 coupled with the SPB 300 and extending along an exterior of the outer skin 320 of the SPB 300 and configured to bias the SPB 300 into a pumpkin-like shape at least when the SPB 300 is pressurized relative to the surrounding atmosphere, for instance when a first pressure inside the SPB 300 is greater than a second pressure of the surrounding atmosphere.

The SPB 300 is shown with bulges 340. The bulges 340 may be portions of the skin 320 that are located farther outward than adjacent portions of the skin 320. For example, the bulges 340 may be curved portions of the gores 325 that are located farther radially from the longitudinal axis 305 than adjacent portions of longitudinal edges of the gores 325.

The SPB 300 may be in a "pumpkin" shape. The pumpkin shape may include the multiple bulges 340, a flattened top, a flattened bottom, and/or non-circular lateral cross-sections of the skin 320 (i.e., cross-sections of the skin 320 taken along a plane that includes the longitudinal axis 305). The skin 320 and accessories such as the tendons 330, tape 335, etc. may be designed to achieve the pumpkin configuration.

The SPB's described herein may have any of the features of various other SPB's, such as those described in U.S. Pat. No. 9,540,091, issued Jan. 10, 2017, titled High Altitude Balloon Systems and Methods, the entire disclosure of which is incorporated herein by reference for all purposes and forms a part of this specification. For instance, the LTA system 302 may include two, three, four or more of the SPB's 300 connected together.

D. Magnetic Ballast Dispenser

Figure 4A:
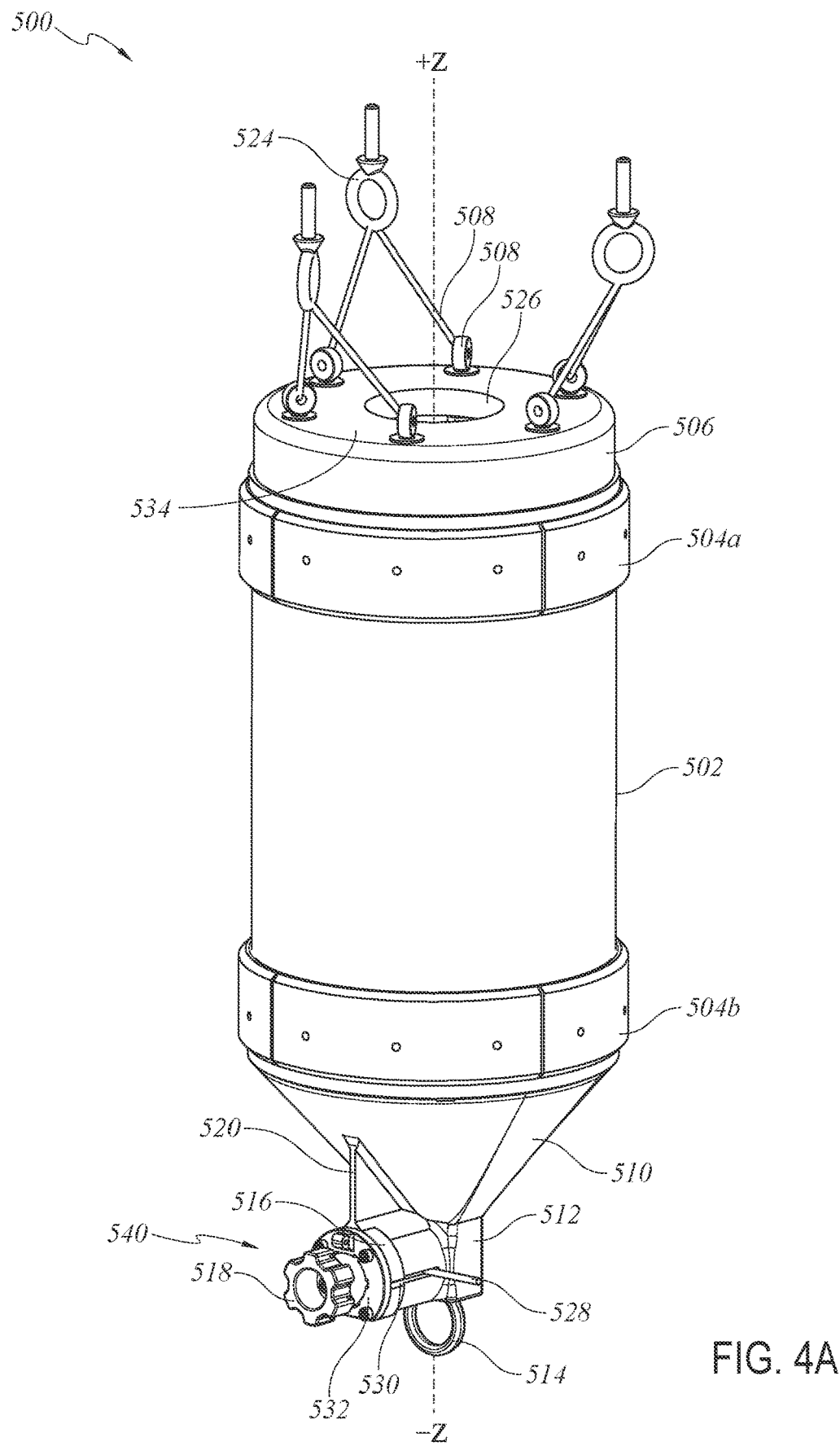
FIG. 4A illustrates a perspective view of an embodiment of the magnetic ballast dispenser.
Figure 4B:
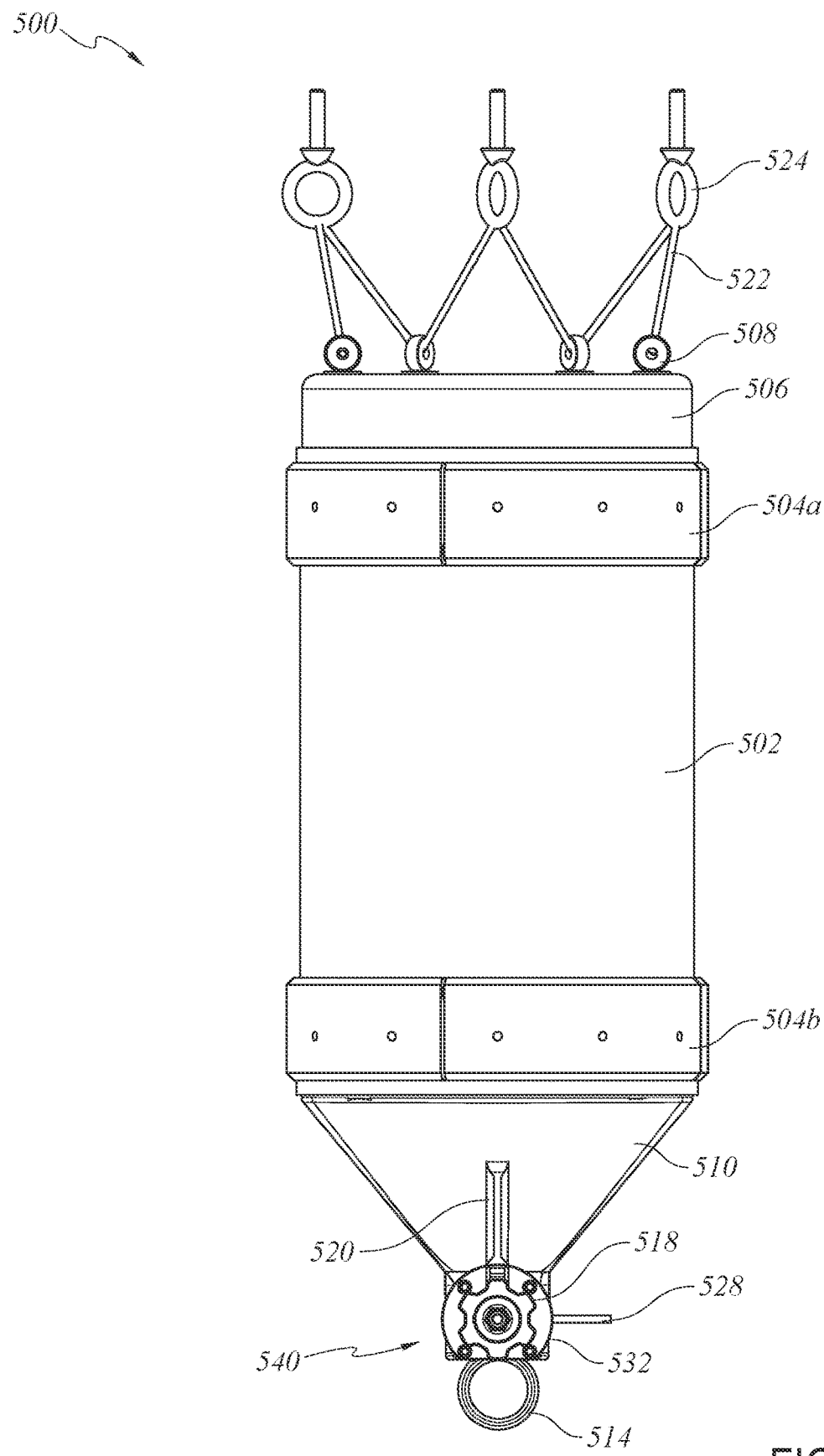
FIG. 4B illustrates a front view of the magnetic ballast dispenser of FIG. 4A.
Figure 4C:
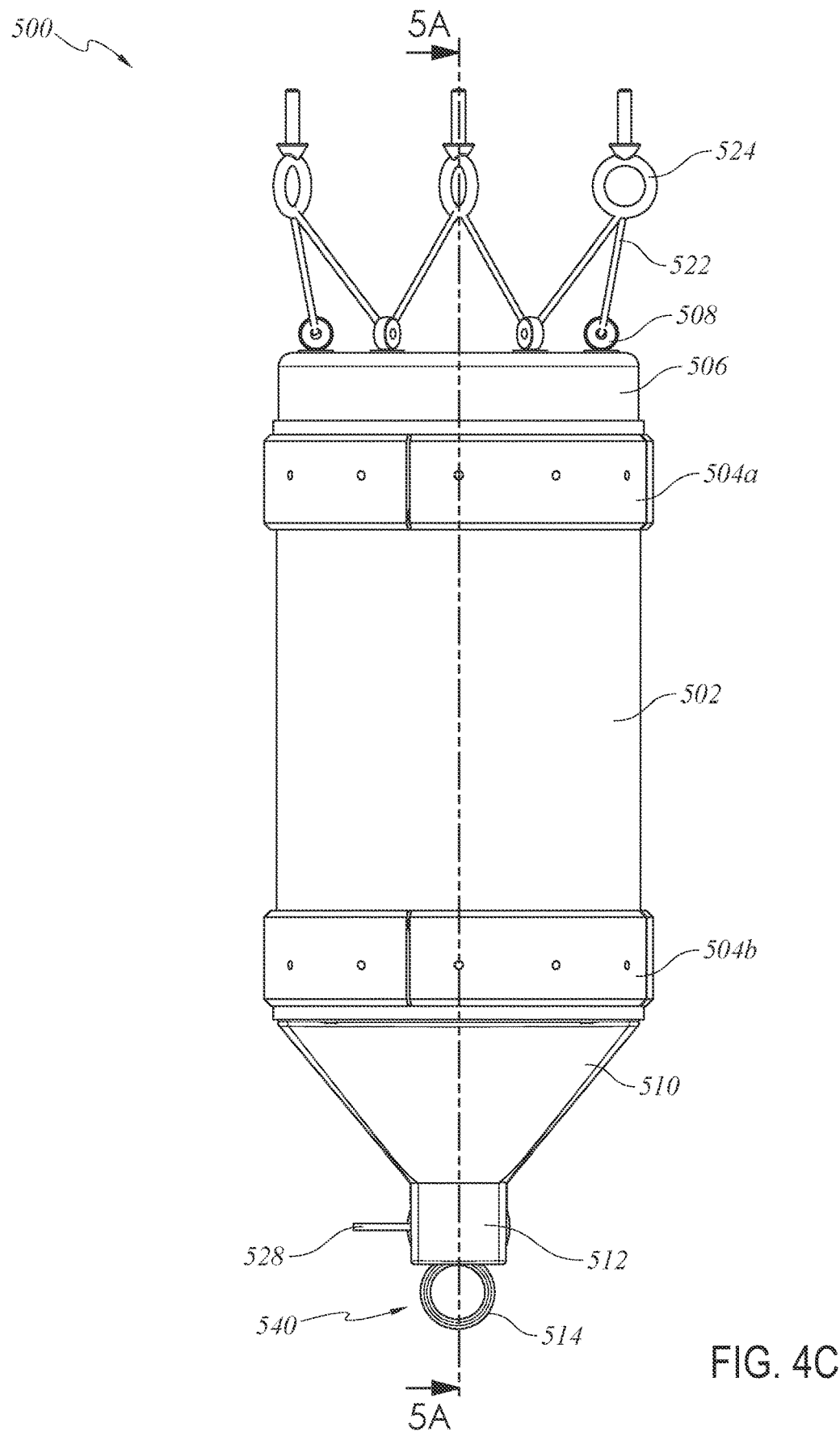
FIG. 4C illustrates a rear view of the magnetic ballast dispenser of FIG. 4A.
Figure 4D:
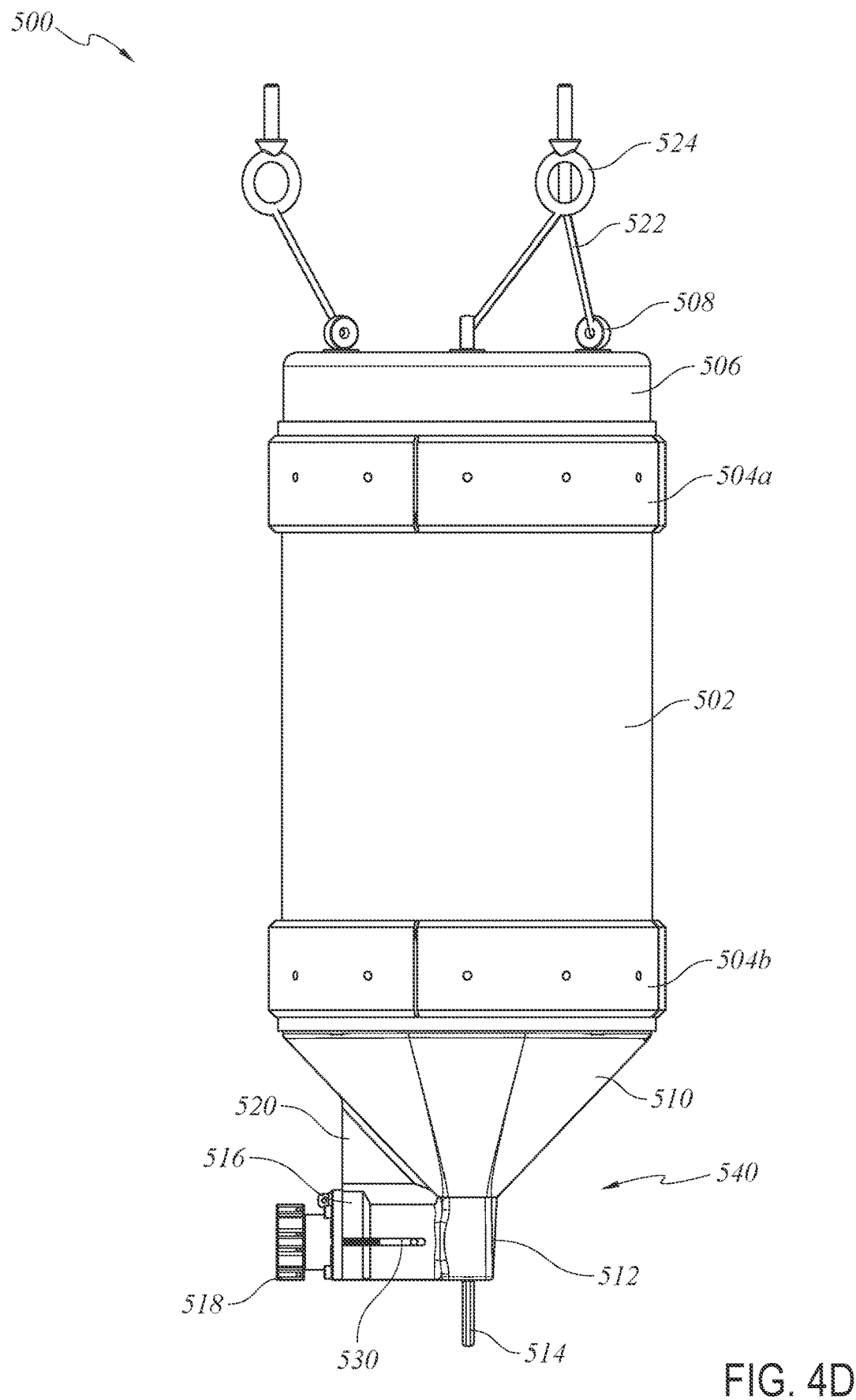
FIG. 4D illustrates a right-side view of the magnetic ballast dispenser of FIG. 4A.
Figure 4E:
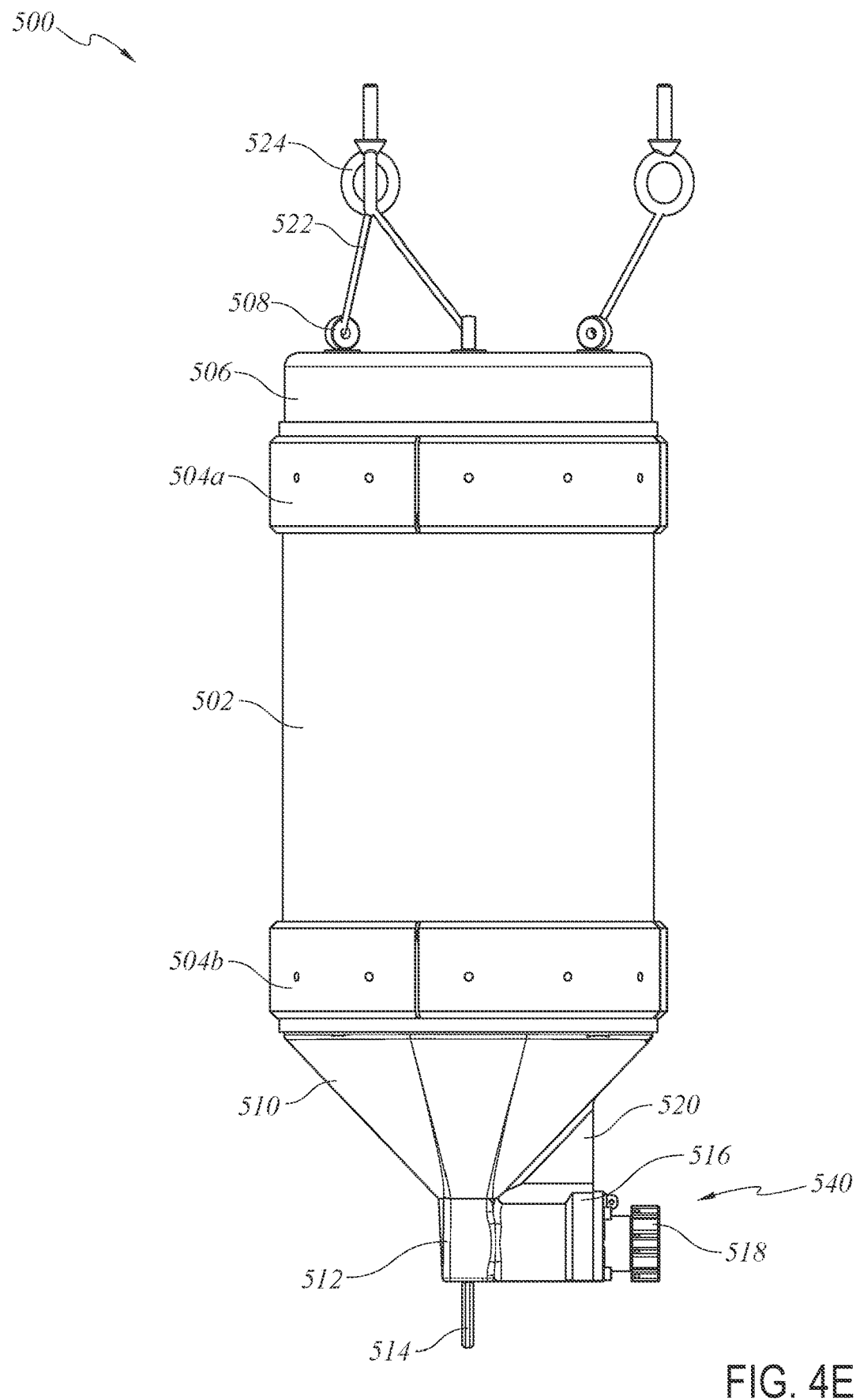
FIG. 4E illustrates a left-side view of the magnetic ballast dispenser of FIG. 4A.
Figure 4F:
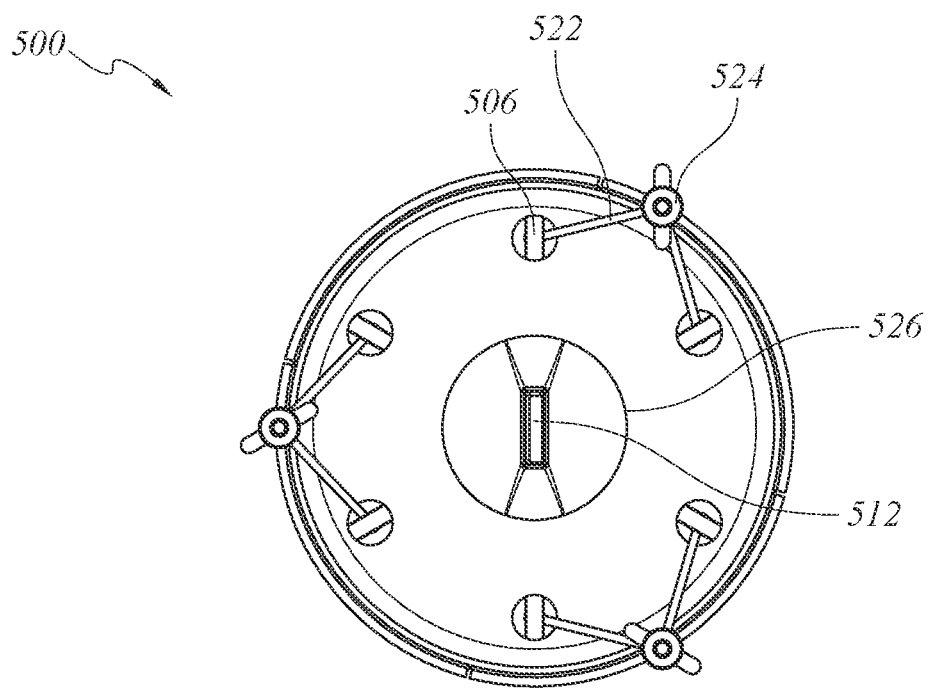
FIG. 4F illustrates a top view of the magnetic ballast dispenser of FIG. 4A.
Figure 4G:
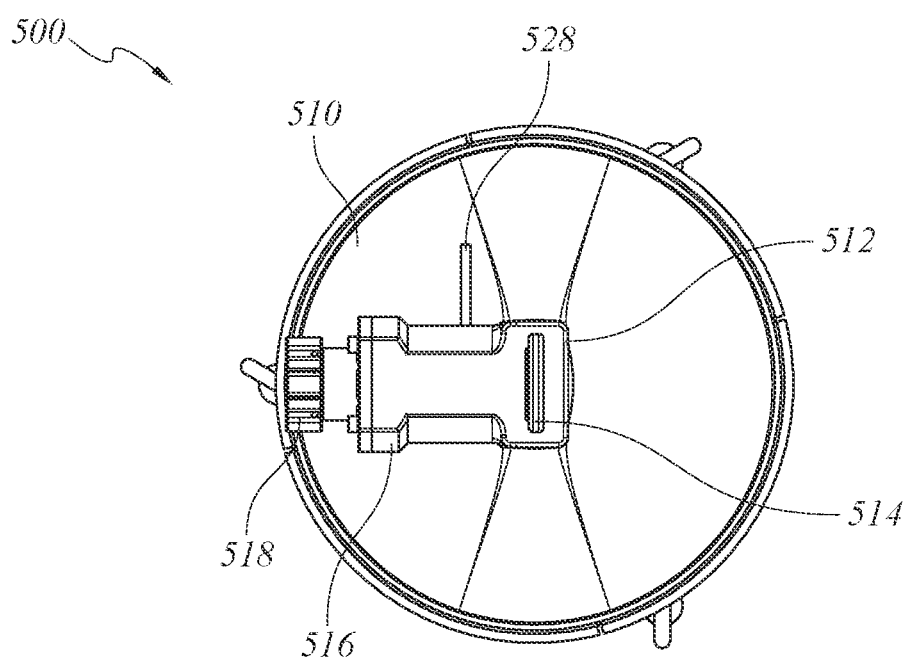
FIG. 4G illustrates a bottom view of the magnetic ballast dispenser of FIG. 4A.

FIGS. 4A-4G illustrate various views of the ballast dispenser 500. FIG. 4A is a perspective view of the ballast dispenser 500. FIG. 4B is a front view of the ballast dispenser 500. FIG. 4C is a rear view of the ballast dispenser 500. FIG. 4D is a first side view of the ballast dispenser 500. FIG. 4E is a second side view of the ballast dispenser 500. FIG. 4F is a top view of the ballast dispenser 500. FIG. 4G is a bottom view of the ballast dispenser 500.

As described in further detail herein, the ballast dispenser 500 may retain ballast within the ballast dispenser 500 without the use of power. The ballast dispenser 500 may employ a dispensing method for ballast that does not use power when ballast is not being dispensed.

In some embodiments, the components of the ballast dispenser 500 may be stationary while ballast is being dispensed. The ballast dispenser 500 may dispense ballast without moving parts (e.g., without a motorized mechanism). In contrast, conventional ballast systems often use complex motorized mechanisms that require additional power and heating and may be prone to failure.

In some embodiments, the ballast dispenser 500 may include an electro-permanent magnet, as further described. The electro-permanent magnet may create a first magnetic field in a passive state (i.e., without the application of power). As described in further detail herein, power may be supplied to a coil to create a second magnetic field that cancels out or reduces the strength of the first magnetic field. The reduced net magnetic field acting on the ballast may allow the ballast to fall freely from the dispenser.

By creating a first magnetic field in the passive state, the electro-permanent magnet may retain magnetic ballast material within the ballast dispenser 500 while the electro-permanent magnet is in the passive state. To dispense ballast, power may be applied to the electro-permanent magnet, e.g., to a coil, to generate a second magnetic field that cancels out or weakens the first magnetic field, allowing the ballast to dispense (e.g., due to the force of gravity). For example, while both the first magnetic field and second magnetic field may be generated by the electro-permanent magnet, a net external magnetic field may be provided by the electro-permanent magnet having a magnetic field strength below a threshold value for retaining the ballast material within the ballast dispenser 500 under the force of gravity.

During LTA flight, ballast may be dropped infrequently over the course of a flight and held in place for the majority of the flight. By applying power only when dispensing ballast, the ballast dispenser 500 may thus significantly reduce the overall amount of power required during an LTA flight, for example, in comparison to a typical electromagnet which requires power to generate an electromagnetic field to hold magnetic material in place.

The ballast dispenser 500 may include a silo 502 for holding ballast material. In some embodiments, the silo 502 or at least a portion thereof may have a cylindrical or generally cylindrical shape. In other embodiments, the shape of the silo 502 may be rectangular, pyramidal, conical, frustoconical, or any other suitable shape.

In some embodiments, the silo 502 may be made of a collapsible material. A collapsible material may allow for the silo 502 to easily compress, for example, to minimize the risk of structural damage during landing of the LTA system. In some embodiments, the silo 502 may be made of a textile or clothlike material. In some embodiments, the silo 502 may be made of a high tensile strength material (e.g., nylon or a nylon blend). In some embodiments, the silo 502 may be made of high tensile strength Cordura® fabric.

The use of textile material for the silo 502 (and/or other components of the ballast dispenser 500) may allow for a high ballast capacity to structural weight ratio. The structural weight may refer to the empty weight of the ballast dispenser 500 without any ballast material therein. The textile silo 502 may allow the ballast volume to be increased while limiting the necessary structural weight to contain it (e.g., due to the light weight material forming the silo 502). Further, the use of textile material may allow the ballast dispenser 500 to collapse if it becomes part of the load path during a landing event. The textile material may allow for easy compression of the ballast dispenser 500 without incurring structural damage. The silo 502 may therefore be reusable for subsequent flights. Further, the use of textile material may allow for the ballast silo 502 to be designed in virtually any shape.

In some embodiments, the ballast dispenser 500 may include a nozzle 510. The nozzle 510 may be coupled with the silo 502. For example, the nozzle 510 may be located on a lower end of the silo 502. The nozzle 510 may act as a funnel for ballast material contained within the silo 502.

In some embodiments, the nozzle 510 may resemble a funnel shape which gradually tapers in the −Z direction. In some embodiments, the nozzle 510 may resemble a hollow, inverted pyramid. In some embodiments, the inverted pyramid may have two elongated sides and two shortened sides. In some embodiments, the nozzle 510 may be conical or frustoconical in shape. In some embodiments, the nozzle 510 may be formed of a rigid material, such a metal or metal alloy. In some embodiments, the nozzle 510 may be formed of a ferrous metal.

In some embodiments, the ballast dispenser 500 may include a dispensing tube 512. The dispensing tube 512 may be disposed on a lower end of the nozzle 510. Ballast material within the silo 502 may be directed via gravity to the dispensing tube 512 via the nozzle 510.

In some embodiments, the dispensing tube 512 is part of the nozzle 510. In some embodiments, the nozzle 510 and dispensing tube 512 form one integral piece. In other embodiments, the dispensing tube 512 may be removably coupled to the nozzle 510.

The dispensing tube 512 may be cylindrical, conical, shaped as a prism, or any other suitable shape. In some embodiments, the dispensing tube 512 may be formed of a rigid material, such a metal or metal alloy. In some embodiments, the dispensing tube 512 may be formed of a ferrous metal.

When the magnetic ballast dispensing system 500 is activated (e.g., by supplying power to an electro-permanent magnet) ballast material may be dispensed out of an opening in the lower end of the dispensing tube 512, as described in further detail herein. When the magnetic ballast dispensing system 500 is in a passive state (e.g., when power is not supplied to the electro-permanent magnet), ballast material may be retained within the silo 502, nozzle 510, and/or dispensing tube 512.

In some embodiments, the ballast dispenser 500 may include a top cap 506. The top cap 506 may be coupled with the silo 502. In some embodiments, the top cap 506 may be located on an upper end of the silo 502. In some embodiments, the top cap 506 may be cylindrical in shape.

The top cap 506 may at least partially cover the interior of the silo 502. The top cap 506 may have an upper surface 534, which may be positioned perpendicular to the Z-axis 105. The upper surface 534 may have an aperture 526. In some embodiments, the aperture 526 may be positioned centrally within the upper surface 534 as shown in FIGS. 4A and 4F. Ballast material may be loaded and optionally unloaded through the aperture 526.

The top cap 506 may include or be coupled to one or more anchor rings 508. In some embodiments, one or more anchor rings 508 may be fastened to the top cap 506. In some embodiments, the one or more anchor rings 508 may extend from the upper surface 534. In some embodiments, the one or more anchor rings 508 may include a ring portion and a screw portion which fastens to the top cap 506. In some embodiments, the anchor rings 508 may be coupled to suspension lines 522. The suspension lines 522 may be inserted in the ring portion of the one or more anchor rings 508. There may be three pairs of anchor rings 508 as shown, or one, two, or more pairs.

In some embodiments, the ballast dispenser 500 may include mounting hardware 524. The mounting hardware 524 may be coupled to the top cap 506 via the suspension lines 522. The mounting hardware 524 may be attached to a stratocraft 400, ZPB 200, or SPB 300 to couple the ballast dispenser 500 to the rest of the LTA system.

In an example embodiment, the top cap 506 may feature three pairs of two anchor rings 508 disposed radially and equally spaced around the aperture 526. Each pair of anchor rings 508 may be attached to a unique mounting hardware 524 by a single suspension line 522.

In some embodiments, the ballast dispenser 500 may include one or more clamps 504a,b. The one or more clamps 504a,b may be textile clamps. In some embodiments, the one or more clamps 504a,b may be positioned circumferentially around the silo 502.

The clamps 504a,b may be configured to couple the textile material of the silo 502 to one or more other components of the ballast dispenser 500. For example, the clamp 504a may couple the silo 502 to the top cap 506. In some embodiments, the clamp 504a may clamp the material of the silo 502 between the clamp 504a and the top cap 506. The clamp 504b may couple the silo 502 to the nozzle 510. In some embodiments, the clamp 504b may clamp the material of the silo 502 between the clamp 504b and the nozzle 510.

In some embodiments, at least a portion of the one or more clamps 504a,b and/or the nozzle 510 and/or the top cap 506 may be made of a collapsible material. In some embodiments, at least a portion of the one or more clamps 504a,b, the nozzle 510, and/or the top cap 506 may be made of a clothlike or textile material. In some embodiments, at least a portion of the one or more clamps 504a,b, the nozzle 510, and/or the top cap 506 may be made of a rigid material. A rigid nozzle 510, top cap 506, and/or one or more clamps 504a,b may provide structural support to the silo 502. In some embodiments, at least a portion of the one or more clamps 504a,b, the nozzle 510, and/or the top cap 506 may be made of a material including leather, plastic, carbon fiber, composite polymer, rubber or metal.

In some embodiments, the one or more clamps 504a,b may be ringlike in shape and placed concentric with the silo 502. In some embodiments, the ballast dispenser 500 may feature a total of two clamps 504a,b. In other embodiments, additional clamps may be provided to secure the silo 502 with other structural features of the ballast dispenser 500.

In some embodiments, a transport plug 514 may be inserted into the dispensing tube 512 to prevent any ballast material from exiting the ballast dispenser 500, alternatively or in addition to an electro-permanent magnet preventing the ballast from exiting. The transport plug 514 may be inserted prior to a flight to prevent ballast material from exiting the ballast dispenser 500 (for example, when transporting the ballast dispenser 500 or preparing the ballast dispenser for flight), and removed at or before launch to allow use of the electro-permanent magnet of the ballast dispenser 500 for retaining the ballast during a high-altitude flight.

In some embodiments, the ballast dispenser 500 may include a magnet assembly 540. The magnet assembly 540 may include one or more magnets (e.g., one or more electro-permanent magnets) that may be used to control the dispensing of ballast material from the silo 502, as described herein. The magnet assembly 540 may be located at a lower end of the ballast dispenser 500 adjacent or near the opening through which ballast exits the dispenser.

In some embodiments, the magnet assembly 540 may include a magnet housing 516. The magnet housing 516 may be positioned on one side of (i.e., lateral to) the dispensing tube 512. Lateral may include a direction that is radially away from the Z axis. The Z axis may be defined the by ballast dispenser, e.g., by the silo 502 and/or the dispensing tube 512. The magnet housing 516 may include an interior volume for housing one or more magnets (e.g., an electro-permanent magnet), as described in further detail herein. In some embodiments, the magnet housing 516 is tubular in shape. In some embodiments, the magnet housing 516 may resemble or conform to the shape of a magnet contained within.

In some embodiments, the magnet housing 516 may be coupled with, e.g. removeably or fixedly attached to, the dispensing tube 512. In some embodiments, a support truss 520 may secure the magnet housing 516 to the nozzle 510. A first end of the magnet housing 516 may be positioned adjacent to, or extend from, an elongated surface of the dispensing tube 512. In some embodiments, a second opposite end of the magnet housing 516 may be closed off or sealed with a face plate 532. In some embodiments, the face plate 532 may be removably attached to the magnet housing 516 and allow for insertion and removal of a magnet. In some embodiments, the face plate 532 may be bolted to the magnet housing 516.

In some embodiments, the magnet assembly 540 may include an adjustment knob 518. The adjustment knob 518 may be operated, e.g., rotated, to change a lateral position of a magnet of the magnet assembly 540, for example, to alter the position of a magnetic field and/or alter the strength of a magnetic field at a particular location. In some embodiments, the adjustment knob may be coupled with the face plate 532.

In some embodiments, the magnet housing 516 may have a channel 530 that extends at least partially along its length. The channel 530 may extend in a direction perpendicular to the longitudinal axis 105. The channel 530 may accommodate a protrusion 528 which extends from the magnet within the magnet housing 516. The protrusion 528 may move within the channel 530 in response to movement of the magnet within the housing. The protrusion 528 may serve as an indicator of the magnets position within the magnet housing 516. The protrusion 528 may also prevent rotation of the magnet within the housing 516. In some embodiments, the protrusion 528 may be in the form of a shaft or bar.

Figure 5A:
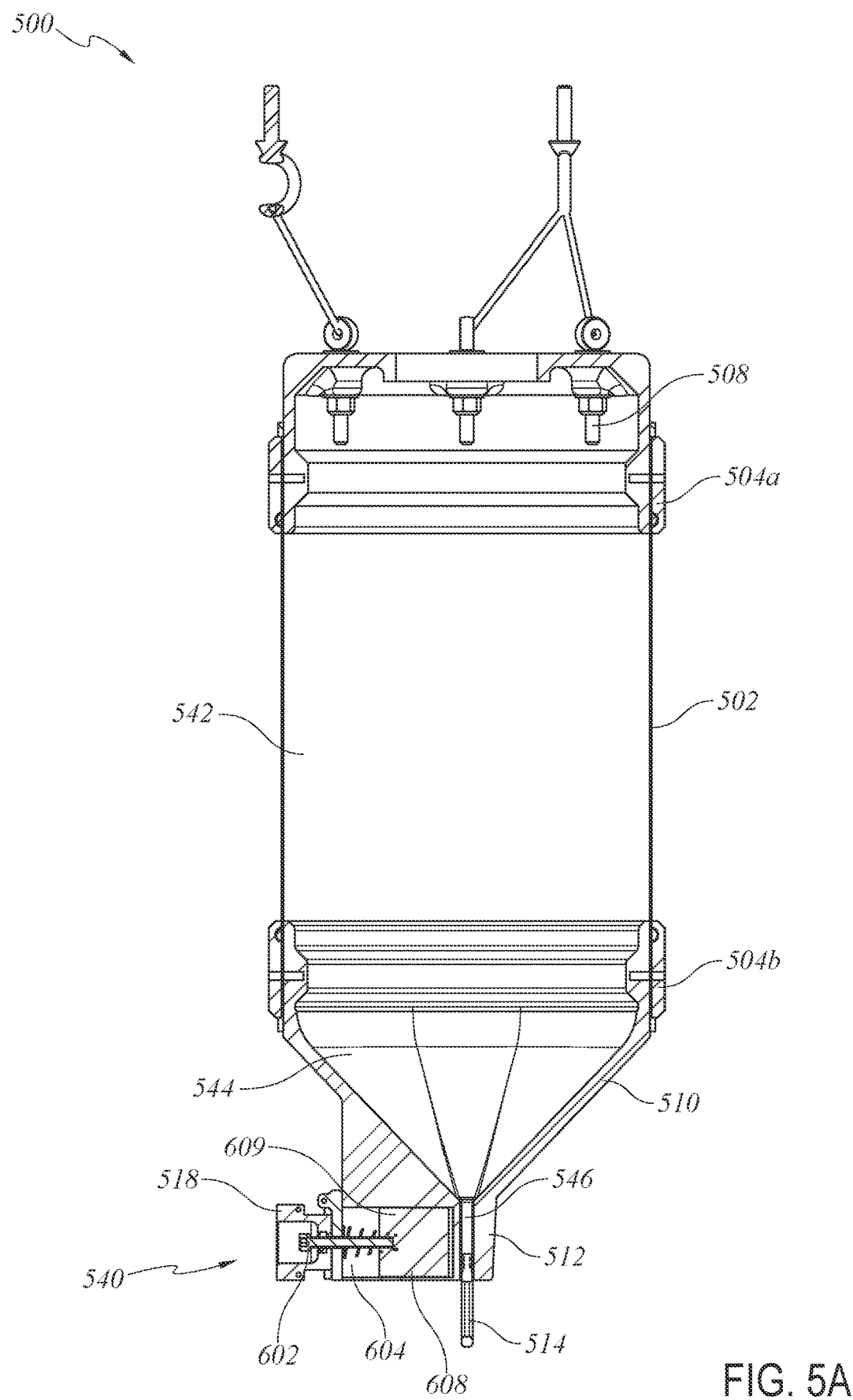
FIG. 5A illustrates a sectional side view of the magnetic ballast dispenser of FIG. 4A.
Figure 5B:
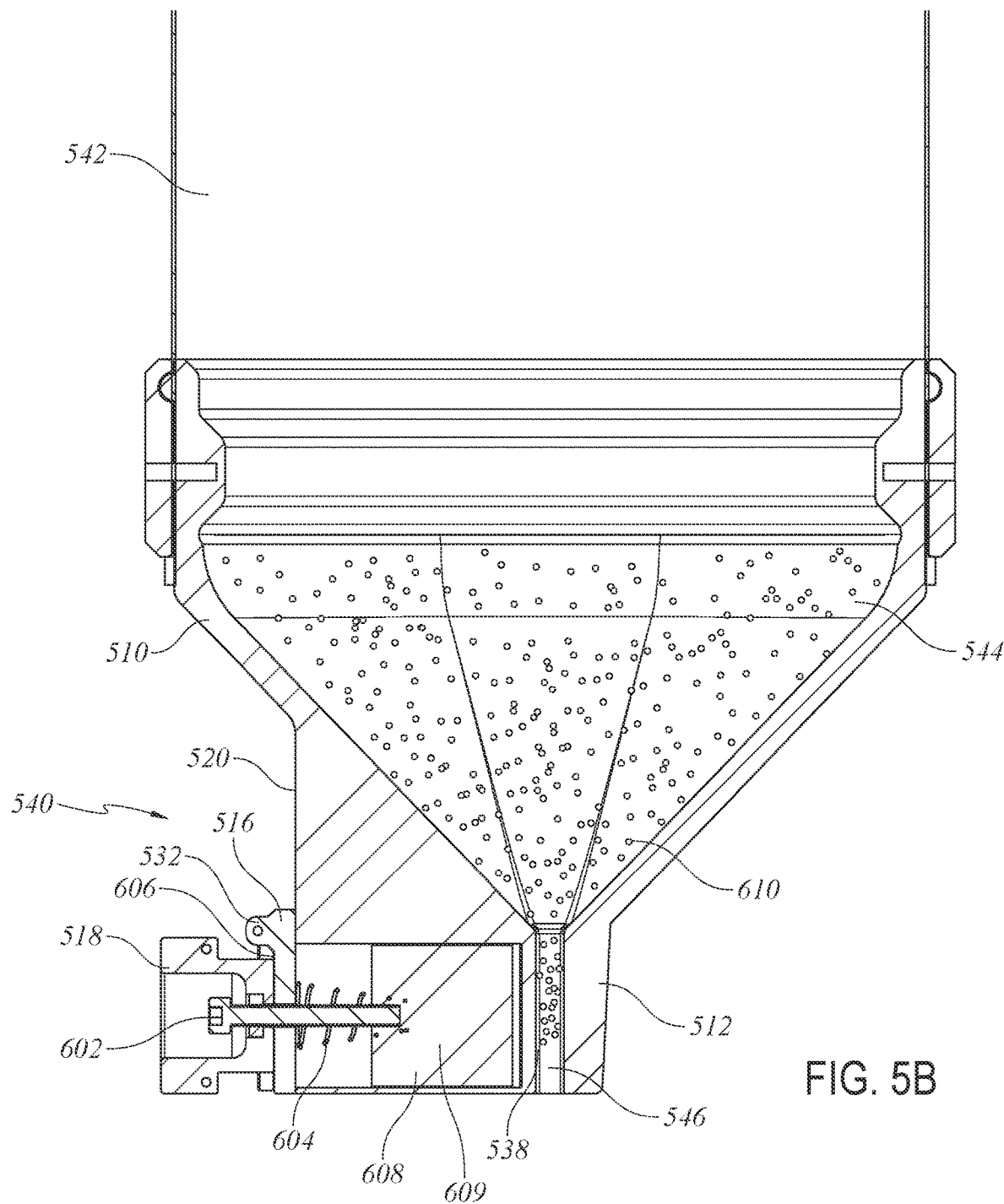
FIG. 5B illustrates a partial sectional side view of the magnetic ballast dispenser of FIG. 4A filled with ballast material.
Figure 5C:
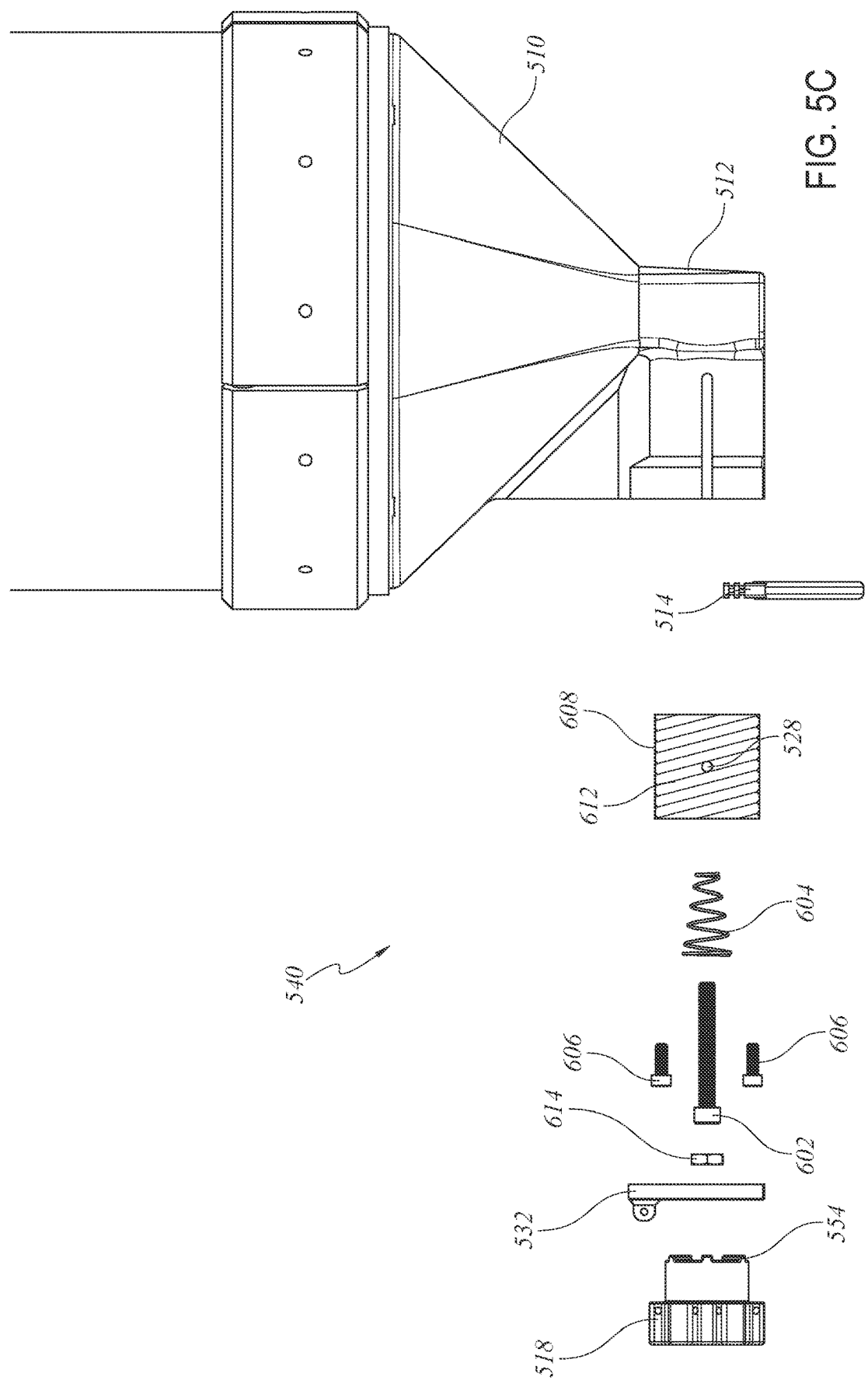
FIG. 5C illustrates a partial exploded view of the magnetic ballast dispenser of FIG. 4A.
Figure 5D:
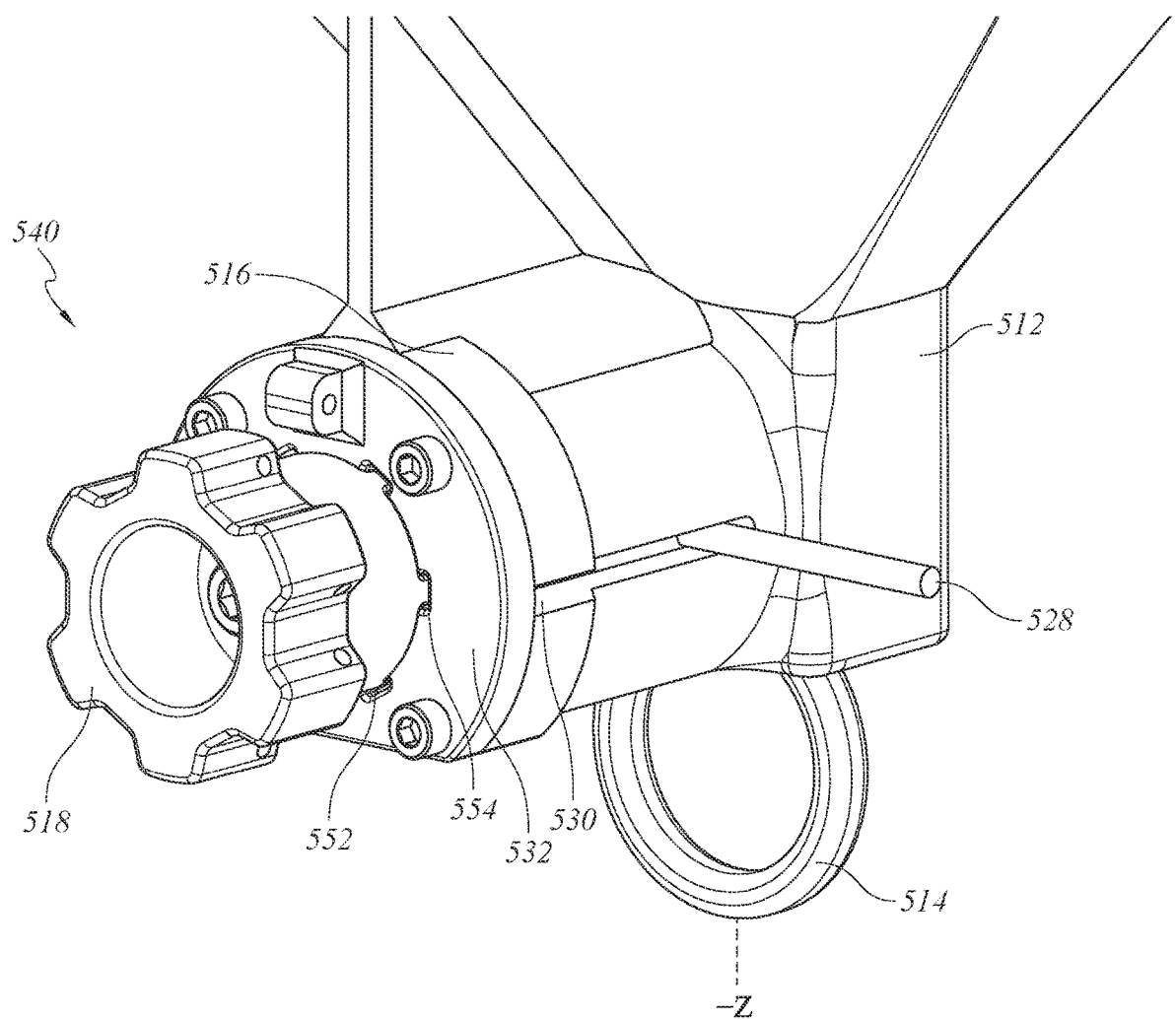
FIG. 5D illustrates a partial perspective view of the magnetic ballast dispenser of FIG. 4A.

FIG. 5A illustrates a cross-sectional side view of the ballast dispenser 500. FIG. 5B illustrates a partial cross-sectional side view of the ballast dispenser 500 showing the nozzle 510 filled with ballast material. FIG. 5C illustrates a partial exploded view of the ballast dispenser 500. FIG. 5D illustrates a partial perspective view of the ballast dispenser 500.

As shown in FIG. 5B, the ballast dispenser 500 may be filled with a ballast material 610. In some embodiments, the ballast dispenser 500 may be filled with ballast material 610 before launch of an LTA system, either at the site of the launch or at a remote location. If the ballast dispenser 500 is filled at a remote location, the transport plug 514 may be used to prevent ballast material from dispensing. In some embodiments, the ballast dispenser 500 may be stored with the ballast material 610 inside (for example, with the transport plug 514 in place). The ballast material 610 is shown in the nozzle 510 but it may also occupy all or part of the silo 502.

The ballast material 610 may include any material that is magnetic (e.g., ferrous material) and small enough to fit through the dispensing tube 512. In some embodiments, the ballast material 610 may be steel shot. In some embodiments, the ballast material 610 may be spherical in shape. For example, the ballast material by include a plurality of steel spheres. In some embodiments, the ballast material 610 (e.g., steel spheres) may have a diameter no greater than 3 millimeters (mm), no greater than 2 mm, no greater than 1.5 mm, no greater than 1 mm, no greater than 0.5 mm, about 3 mm, about 2 mm, about 1.5 mm, about 1 mm, about 0.5 mm, or any other suitable diameter. In some embodiments, the steel shot may be size #25 mesh.

In some embodiments, the ballast material 610 may be introduced within an interior 542 of the silo 502. The ballast material 610 may flow from the interior 542 of the silo 542 into an interior 544 of the nozzle 510 and through the nozzle 510 into an inner lumen 546 of the dispensing tube 512.

The magnet assembly 540 may include a magnet 608, such as an electro-permanent magnet. The magnet 608 may be positioned inside of the magnet housing 516. The magnet 608 may be cylindrical, shaped as a prism, or any other suitable shape. The magnet 608 may exert a magnetic field while in a passive state (i.e., without the application of power to the magnet 608). The magnetic field exerted by the magnet 608 in the passive state may draw ballast material 610 within the dispensing tube 512 towards a sidewall 538 of the dispensing tube 512 adjacent to the electro-permanent magnet. The magnetic field may thus retain the ballast material 610 in place and effectively create a blockage of ballast material 610 within the dispensing tube 512 to prevent dispensing of the ballast material 610 on which the magnetic field is acting and of the ballast material 610 above the blockage, e.g., in the silo 502.

The magnet 608 may receive power and, upon receipt of power, generate a second opposing magnetic field that cancels out or reduces the strength of the magnetic field attracting the ballast material 610, resulting in no net external magnetic field or a reduced or relatively smaller external magnetic field acting on the ballast material 610. The net external magnetic field may be sufficiently small (i.e., below a threshold value) such that the force of gravity acting on the ballast material 610 overcomes the force of the net reduced external magnetic field. When the net external magnetic field that acts on the ballast material 610 is at or below the threshold field value, the ballast material 610 may be free to move within the dispensing tube 512, allowing the ballast material 610 to be dispensed downward under the force of gravity.

The magnet 608 may be an electro-permanent magnet that includes a passive magnet 609 and a coil 612. In some embodiments, generation of the magnetic field while the magnet 608 is in the passive state (which may be referred to as a first magnetic field herein) may be accomplished by the passive magnet 609, as described in further detail herein. Generation of an opposing magnetic field (which may be referred to as a second magnetic field herein) may be accomplished by the coil 612 of the magnet 608 when current is provided to the coil 612, as described in further detail herein. In some embodiments, the first magnetic field may be present both while the electro-permanent magnet 608 is receiving power and while the electro-permanent magnet is not receiving power. The second magnetic field may be generated only when power is supplied to the electro-permanent magnet 608.

In some embodiments, the electro-permanent magnet 608 may include the passive magnet 609 at its core. In some embodiments, the passive magnet 609 may not include a piece of ferritic metal at its core. The passive magnet 609 may exert a magnetic field while in a passive state (i.e., without the application of power). The magnetic field exerted by the passive magnet 609 may interact with the ballast material 610, for example, by attracting the ballast material towards the passive magnet 609. The magnetic field exerted by the passive magnet 609 may draw ballast material 610 within the dispensing tube 512 towards a sidewall 538 of the dispensing tube 512 adjacent to the passive magnet 609 and create a blockage of ballast material 610 within the dispensing tube 512 to prevent dispensing of the ballast material 610, as described.

In some embodiments, the coil 612 may be wrapped around the passive magnet 609 and connected to an electrical power source. The power source may be located on the ballast dispenser 500 or it may be located on the payload or stratocraft or other structure of the flight vehicle. Upon command, the power source may provide a current to flow through the coil 612. Upon current flowing through the coil 612, the coil 612 may create a magnetic field that is opposite in direction to the magnetic field of the passive magnet 609. The coil 612 may create a magnetic field that is substantially equal in strength to the magnetic field of the passive magnet 609. The magnetic field generated by the coil 612 may cancel or severely weaken the magnetic field exerted by the passive magnet 609, thus cancelling or severely weakening the magnetic forces acting on the ballast material 610 and allowing the ballast material 610 to dispense from the dispensing tube 512 under the force of gravity.

In some embodiments, in the passive state, the electro-permanent magnet 608 may be configured to provide holding forces that maintain the ballast material within the dispenser at accelerations of greater than 3 times the standard acceleration due to gravity (3G), greater than 4G, or greater than 5G. In some embodiments, the magnet 608 may be configured to provide holding forces that maintain the ballast material 610 within the dispenser at accelerations up to 4G, up to 5G, or up to 6G. In some embodiments, the magnet 608 may be configured to provide holding forces that maintain the ballast material within the dispenser at accelerations up to 5G for up to 2 seconds, up to 1 second, or up to 0.5 seconds.

The ballast dispenser 500 thus provides a dispensing system that does not require power to retain the ballast. Power may only be required to dispense the ballast. By applying power only when dispensing ballast, the ballast dispenser 500 described herein may significantly reduce the overall amount of power required during an LTA flight, for example, in comparison to a typical electromagnet which requires power to generate an electromagnetic field to hold magnetic material in place. In some embodiments, the ballast dispenser may use a continuous power of about 24 Watts (W) when dispensing ballast and 0 W when not dispensing ballast. The dispensing power may be from about 10-40 W, from about 15-35 W, or from about 20-30 W. The dispensing power may be no greater than 30 W, no greater than 25 W, or no greater than 20 W. In some embodiments, the ballast dispenser 500 may have an average energy usage per day of about 0.08 watt-hours. In some embodiments, the ballast dispenser 500 may have an average energy usage per day of between 0.01 watt-hours and 0.5 watt-hours, between 0.04 watt-hours and 0.12 watt-hours, less than 0.1 watt-hours, less than 0.2 watt-hours, less than 0.3 watt-hours, about 0.05 watt-hours, about 0.1 watt-hours, or about 0.2 watt-hours.

The ballast dispenser 500 may not have moving parts (other than released ballast material). The ballast dispenser 500 may allow for dispensing of ballast material without moving any components of the magnet assembly 540 or ballast dispenser 500. Dispensing ballast material without moving any components may reduce the amount of power used in comparison to dispensing systems with moving parts, which may use additional power to operate and increase temperatures when dispensing at high altitudes and/or low temperatures.

By reducing the overall amount or power required during an LTA flight, the ballast dispenser 500 may allow for a reduction in weight of the LTA system, for example, by reducing or obviating the need for additional power providing components, such as additional batteries and/or solar panels. By reducing the need for additional components and by dispensing without moving components, the ballast dispenser 500 may also reduce the mechanical complexity of dispensing and thus reduce the chance of malfunction. The solid state design of the ballast dispenser 500 may limit the number of failure modes and increases the manufacturability of the assembly.

In some embodiments, ballast dispenser 500 may have a height of 18 inches (in) or about 18 in. In some embodiments, the height of the ballast dispenser 500 may be between 8 in and 28 in. In some embodiments, the ballast dispenser 500 may have a diameter of 8 in or about 8 in. In some embodiments, the diameter of the ballast dispenser 500 may be between 4 in and 12 in.

In some embodiments, the mass of the ballast dispenser 500 without any ballast material within may be between 0.5 kilograms (kg) and 5 kg, between 1 kg and 3 kg, between 1.5 kg and 2 kg, no greater than 5 kg, no greater than 3 kg, no greater than 2 kg, no greater than 3 kg, about 0.5 kg, about 1 kg, about 1.5 kg, about 1.7 kg, about 2 kg, or about 3 kg.

In some embodiments, the ballast dispenser 500 may have a ballast carrying capacity of between 10 kg and 40 kg, between 15 kg and 35 kg, between 20 kg and 30 kg, at least 10 kg, at least 15 kg, at least 20 kg, at least 25 kg, at least 30 kg, at least 35 kg, at least 40 kg, about 10 kg, about 15 kg, about 20 kg, about 25 kg, about 30 kg, about 35 kg, or about 40 kg.

In some embodiments, the ballast dispenser 500 may provide a ballast carrying capacity to structural weight ratio of about 25:1.7. The structural weight here may refer to the empty weight or mass of the ballast dispenser, i.e., the weight or mass of the remainder of the ballast dispenser 500 without the ballast material. In some embodiments, the ballast dispenser 500 may provide a ballast carrying capacity to structural weight ratio of between 25:2.5 and 25:1, at least 25:2.5, at least 25:2, at least 25:1.7, at least 25:1, or any other suitable range.

In some embodiments, the ballast dispenser 500 may be operated at altitudes up to 55,000 ft, up to 75,000 ft, up to 95,000 ft, or up to 125,000 ft. In some embodiments, the ballast dispenser 500 may be operated at altitudes between 55,000 ft and 125,000 ft, between 55,000 ft and 95,000 ft, between 55,000 ft and 75,000 ft, between 75,000 ft and 95,000 ft, or between 75,000 ft and 125,000 ft. In some embodiments, the ballast dispenser 500 may be operated at altitudes of at least 55,000 ft, at least 75,000 ft, or at least 95,000 ft. The altitudes specified herein may be in reference to distance above sea level, unless otherwise indicated.

In some embodiments, the ballast dispenser 500 may operate at temperatures as low as −45° Celsius (C), −55° C., −65° C., −75° C., −85° C., −95° C., between −45° C. and −95° C., or between −55° C. and −85° C. In some embodiments, the ballast dispenser 500 may operate at temperatures of 0° C. or lower, −10° C. or lower, −20° C. or lower, −30° C. or lower, −40° C. or lower, −45° C. or lower.

The magnet 608 may be coupled to the adjustment knob 518. The adjustment knob 518 may be used to adjust a lateral position of the magnet 608 within the magnet housing 516 and relative to the downward path of movement of the ballast material. In some embodiments, the adjustment knob 518 may be used to adjust a distance between the magnet 608 and the dispensing tube 512. For example, the magnet 608 may be moved laterally within the magnet housing 516 further away from or closer to the dispensing tube 512.

By adjusting the distance of the electro-permanent magnet 608 from the dispensing tube 512, the adjustment knob 518 may be used to adjust the strength of the magnetic field exerted on the dispensing tube 512 or ballast material 610 within the dispensing tube 512. For example, the electropermanent magnet 608 may exert a weaker magnetic field on ballast material 610 within the dispensing tube 512 when farther away from the dispensing tube 512 and a stronger magnetic field on ballast material 610 within the dispensing tube 512 when closer to the dispensing tube 512. The adjustment knob 518 may allow a user to adjust the strength of the magnetic field generated by the electro-permanent magnet 608 to a desired amount or to within a desired range (for example, to adjust for variability in magnets). For example, if a magnetic field is too weak, ballast material 610 may be dispensed unintentionally. The magnet 608 may be moved closed to the dispensing tube 512 to apply a stronger magnetic field. As described above, in some embodiments, a transport plug 514 may also be inserted into the dispensing tube 512 (for example, during ground transport or storage) to prevent the ballast material 610 from dispensing when otherwise not intended.

In some embodiments, the magnet 608 may be connected, e.g., threadedly connected, to the adjustment knob 518 by an adjustment screw 602. The adjustment screw 602 may extend through the adjustment knob 518 and face plate 532 and couple to the magnet 608. For example, the adjustment screw 602 may be threadedly coupled to the passive magnet 609.

A nut 614 may help to secure the adjustment screw 602 to the adjustment knob 518. One or more bolts 606 may secure the face plate 532 to the magnet housing 516. A compression spring 604 may be positioned between the magnet 608 and the face plate 532. The compression spring 604 may be a conical, helical, or cylindrical compression spring. In some embodiments, the adjustment screw 602 may be positioned within, e.g., extend through, the compression spring 604. In embodiments having a conical spring 604, as shown in FIG. 5B, narrower coils of the spring 604 can nest within wider coils when compressed. The conical shape may therefore allow the spring 604 to compress a greater amount, for example, compared to a cylindrical spring.

In some embodiments, rotation of the adjustment knob 518 may be prevented in certain positions. For example, the adjustment knob 518 may include a series teeth or protrusions 554 or other coupling features circumferentially located at an inward end thereof that interlock with corresponding recesses 552 or other respective circumferentially located coupling features of the face plate 532 to prevent rotation, as shown, for example, in FIG. 5D. The adjustment knob 518 may be retracted away from the face plate 532 to disengage the protrusions 554 from the recesses 552 and allow rotation of the adjustment knob 518. Retraction of the adjustment knob 518 may compress the compression spring 604 between the electro-permanent magnet 608 and the face plate 532.

When retracted, the adjustment knob 518 may be rotated to adjust the distance of the magnet 608 relative to the dispensing tube 512, for example, by adjusting the lateral depth of the adjustment screw 602 within the magnet 608, e.g., within the passive magnet 609. In some embodiments, rotation of the magnet 608 is prevented (e.g., by the protrusion 528 or due to differences in cross-sectional shape between the electro-permanent magnet 608 and the magnet housing 516) such that rotation of the adjustment knob 518 causes the adjustment screw 602 to thread further within complementary threads of the magnet 608 or at least partially unthread from the threads of the magnet 608, thereby adjusting a relative distance between the adjustment knob 518 and the magnet 608.

After adjustment, the knob 518 may be released, and the compression spring 604 may extend to laterally inwardly move the magnet 608, causing the adjustment knob 518 to reengage the face plate 532 and rotationally lock in place (e.g., by the protrusions 554 engaging the recesses 552). Due to the change in relative distance between the adjustment knob 518 and the magnet 608 after rotation of the adjustment knob 518, the distance between the magnet 608 and the dispensing tube 512 is different after the adjustment knob reengages the face plate 532 than the distance prior to retraction of the adjustment knob 518.

The laterally outward forces of the compression spring 604 may secure the position of the magnet 608 within the magnet housing 516 and relative to the dispensing tube 512. The laterally outward forces of the compression spring 604 may prevent retraction of the adjustment knob 518 away from the face plate 532 in the absence of external force from a user.

While the foregoing describes use of the magnet assembly 540, nozzle 510, and dispensing tube 512 with the silo 502, it is understood that the magnet assembly 540, nozzle 510, and/or dispensing tube 512 may be used with any suitable silo structure, as will be appreciated by those of skill in the art in view of the disclosure herein. Additionally, while the foregoing describes use of the magnet assembly 540 with the dispensing tube 512, the magnet assembly 540 may be used with any suitable dispensing structure, as will be appreciated by those of skill in the art in view of the disclosure herein.

E. EXAMPLES

Additional embodiments are disclosed in further detail in the following examples, which are not in any way intended to limit the scope of the claims.

1. Example 1

In a first experiment, the ballast dispenser 500 was placed in a thermal vacuum chamber. No thermal conditioning was applied to the ballast dispenser 500. The ballast dispenser 500 was allowed to equilibrate with the chamber temperature before initiating testing. After the ballast dispenser 500 was allowed to equilibrate with the chamber temperature, operation of the ballast dispenser 500 was tested at temperatures down to −65° C. and pressures up to 75,000 ft pressure altitude. The ballast dispenser 500 was able to successfully dispense ballast material at the tested temperatures down to −65° C. and pressures up to 75,000 ft pressure altitude

2. Example 2

In a second experiment, the ballast dispensers 500 were implemented and successfully dispensed ballast in 5 flights operated between 55,000 ft and 75,000 ft.

Various modifications to the implementations described in this disclosure will be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations, unless otherwise stated.

Certain features that are described in this specification in the context of separate implementations also may be implemented in combination in a single implementation. Conversely, various features that are described in the context of a single implementation also may be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Additionally, other implementations are within the scope of the following claims. In some cases, the actions recited in the claims may be performed in a different order and still achieve desirable results.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A ballast dispenser for a lighter-than-air high altitude balloon system, the ballast dispenser comprising:
   a silo containing magnetic ballast material;
   a dispensing tube positioned to receive the magnetic ballast material from the silo;
   an electro-permanent magnet positioned entirely lateral to one side of the dispensing tube, wherein the electro-permanent magnet passively exerts a magnetic field on the magnetic ballast material in the dispensing tube to retain the magnetic ballast material within the dispensing tube; and
   an adjustment knob coupled to the electro-permanent magnet and operable to adjust a lateral distance between the electro-permanent magnet and the dispensing tube.

2. The ballast dispenser of claim 1, wherein the magnetic field is a first magnetic field, wherein the electro-permanent magnet is configured to generate a second magnetic field in response to receiving power that opposes the first magnetic field so that a net external magnetic field provided by the electro-permanent magnet has a net magnetic field strength less than a first magnetic field strength of the first magnetic field.

3. The ballast dispenser of claim 2, wherein the net magnetic field strength provided by the net external magnetic field when power is received by the electro-permanent magnet is no greater than a magnetic field strength threshold for retaining the magnetic ballast material within the dispensing tube.

4. The ballast dispenser of claim 2, wherein the electro-permanent magnet comprises:
   a passive magnet configured to generate the first magnetic field; and
   a coil wrapped around the passive magnet, wherein the coil is configured to generate the second magnetic field when power is received by the electro-permanent magnet.

5. The ballast dispenser of claim 1, wherein the ballast dispenser is configured to dispense the magnetic ballast material without moving components of the ballast dispenser.

6. The ballast dispenser of claim 1, further comprising an adjustment screw coupled to the adjustment knob and configured to be received within the electro-permanent magnet, wherein rotation of the adjustment knob adjusts a depth of the adjustment screw within the electro-permanent magnet to adjust the lateral distance between the electro-permanent magnet and the dispensing tube.

7. The ballast dispenser of claim 6, further comprising a magnet housing containing the electro-permanent magnet.

8. The ballast dispenser of claim 7, further comprising a compression spring within the magnet housing, the compression spring exerting a force on the electro-permanent magnet to maintain a position of the electro-permanent magnet within the magnet housing.

9. The ballast dispenser of claim 7, wherein the magnet housing is configured to couple with the adjustment knob to restrict rotation of the adjustment knob.

10. The ballast dispenser of claim 1, wherein the silo is collapsible.

11. The ballast dispenser of claim 10, wherein the silo comprises a textile material.

12. The ballast dispenser of claim 11, further comprising one or more textile clamps coupled to the silo.

13. The ballast dispenser of claim 1, further comprising a nozzle positioned to funnel the magnetic ballast material from the silo to the dispensing tube.

14. The ballast dispenser of claim 1, wherein the ballast dispenser is configured to operate in the upper atmosphere at temperatures of −75° C. and greater.

15. The ballast dispenser of claim 1, wherein the ballast dispenser is configured to operate in the upper atmosphere at altitudes of 55,000 ft and greater.

16. The ballast dispenser of claim 1, further comprising a removable plug configured to removably seal the dispensing tube.

17. A method of adjusting a position of an electro-permanent magnet of a magnetic ballast dispenser, the method comprising:
    retracting an adjustment knob from a magnet housing of the electro-permanent magnet, the electro-permanent magnet being positioned entirely lateral to one side of a dispensing tube positioned to receive magnetic ballast material from a silo; and
    rotating the adjustment knob to adjust a lateral distance between the electro-permanent magnet and the dispensing tube so as to adjust a strength of a magnetic field exerted by the electro-permanent magnet on the magnetic ballast material in the dispensing tube.

18. The method of claim 17, wherein the magnetic field is a first magnetic field, wherein the method further comprises supplying power to the electro-permanent magnet to generate a second magnetic field that opposes the first magnetic field so that a net external magnetic field provided by the electro-permanent magnet has a net magnetic field strength less than a first magnetic field strength of the first magnetic field.

19. The method of claim 17, further comprising releasing the adjustment knob after rotating the adjustment knob, wherein a spring within the magnet housing is configured to return the adjustment knob to an unretracted position after releasing the adjustment knob.

20. The method of claim 19, wherein the spring is configured to exert a force on the electro-permanent magnet to maintain a position of the electro-permanent magnet within the magnet housing after releasing the adjustment knob.

* * * * *